US008195661B2

(12) United States Patent
Kalavade

(10) Patent No.: US 8,195,661 B2
(45) Date of Patent: *Jun. 5, 2012

(54) METHOD AND APPARATUS FOR STORING DATA ON APPLICATION-LEVEL ACTIVITY AND OTHER USER INFORMATION TO ENABLE REAL-TIME MULTI-DIMENSIONAL REPORTING ABOUT USER OF A MOBILE DATA NETWORK

(75) Inventor: Asawaree Kalavade, Stow, MA (US)

(73) Assignee: Umber Systems, Concord, MA (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/324,671

(22) Filed: Nov. 26, 2008

(65) Prior Publication Data
US 2009/0138427 A1 May 28, 2009

Related U.S. Application Data

(60) Provisional application No. 60/990,328, filed on Nov. 27, 2007.

(51) Int. Cl.
G06F 17/30 (2006.01)
G06F 15/173 (2006.01)
(52) U.S. Cl. .................................. 707/736; 709/224
(58) Field of Classification Search .............. 707/705, 707/724, 784; 709/217–224
See application file for complete search history.

(56) References Cited

U.S. PATENT DOCUMENTS

| | | | |
|---|---|---|---|
| 5,479,176 A | 12/1995 | Zavrel, Jr. | |
| 6,185,440 B1 | 2/2001 | Barratt et al. | |
| 6,229,486 B1 | 5/2001 | Krile | |
| 6,427,531 B1 | 8/2002 | Chintawongvanich | |
| 6,442,529 B1 | 8/2002 | Krishan et al. | |

(Continued)

FOREIGN PATENT DOCUMENTS

WO WO-2009/070748 6/2009

(Continued)

OTHER PUBLICATIONS

"Arbor e100—Unmatched Scale and Intelligence in a Broadband Service Optimization Platform" Arbor Networks, Inc. 1999-2009. (4 pages).

(Continued)

*Primary Examiner* — James Trujillo
*Assistant Examiner* — Jorge A Casanova
(74) *Attorney, Agent, or Firm* — Wilmer Cutler Pickering Hale & Dorr LLP.

(57) ABSTRACT

A method and apparatus for storing data on application-level activity and other user information to enable real-time multi-dimensional reporting about a user of a mobile data network. A data manager receives information about application-level activity from a mobile data network and stores the information to provide dynamic real-time reporting on network usage. The data manager comprises a database, data processing module, and analytics module. The database stores the application-level data for a predetermined period of time. The data processing module monitors the data to determine if it corresponds to a set of defined reports. If the data is relevant, the processing module updates the defined reports. The analytics module accesses the database to retrieve information satisfying operator queries about network usage. If the operator chooses to convert the query into a defined report, the analytics module creates a newly defined report and populates it accordingly.

6 Claims, 22 Drawing Sheets

U.S. PATENT DOCUMENTS

| | | | |
|---|---|---|---|
| 6,442,687 | B1 | 8/2002 | Savage |
| 6,611,867 | B1 | 8/2003 | Bowman-Amuah |
| 6,662,195 | B1 * | 12/2003 | Langseth et al. ............... 1/1 |
| 6,757,543 | B2 | 6/2004 | Moran et al. |
| 6,834,195 | B2 * | 12/2004 | Brandenberg et al. ..... 455/456.3 |
| 6,876,693 | B2 | 4/2005 | Sim |
| 6,943,732 | B2 | 9/2005 | Gottl et al. |
| 6,947,470 | B2 | 9/2005 | Berens |
| 6,993,590 | B1 | 1/2006 | Gauthier et al. |
| 7,080,139 | B1 | 7/2006 | Briggs et al. |
| 7,092,690 | B2 | 8/2006 | Zancewicz |
| 7,106,785 | B2 | 9/2006 | Yoshida |
| 7,209,734 | B2 | 4/2007 | Maes |
| 7,213,032 | B2 | 5/2007 | Mascarenhas |
| 7,242,294 | B2 * | 7/2007 | Warrior et al. ........... 340/539.22 |
| 7,257,546 | B2 * | 8/2007 | Ebrahimi et al. .......... 705/14.73 |
| 7,260,370 | B2 | 8/2007 | Wang et al. |
| 7,328,262 | B2 | 2/2008 | McDonagh et al. |
| 7,340,438 | B2 | 3/2008 | Nordman et al. |
| 7,444,655 | B2 | 10/2008 | Sardera |
| 7,463,898 | B2 | 12/2008 | Bayne |
| 7,464,187 | B2 | 12/2008 | Glommen et al. |
| 7,505,765 | B2 | 3/2009 | Frangione et al. |
| 7,551,913 | B1 | 6/2009 | Chien |
| 7,590,547 | B2 | 9/2009 | Lagadec et al. |
| 7,689,432 | B2 | 3/2010 | Gross |
| 7,689,682 | B1 * | 3/2010 | Eldering et al. ............. 709/223 |
| 7,698,422 | B2 | 4/2010 | Vanderhook et al. |
| 7,796,578 | B2 * | 9/2010 | Stafford ....................... 370/351 |
| 7,801,058 | B2 | 9/2010 | Wang |
| 7,865,187 | B2 | 1/2011 | Ramer et al. |
| 7,890,581 | B2 | 2/2011 | Rao et al. |
| 7,895,234 | B2 | 2/2011 | Lillie et al. |
| 2001/0036224 | A1 | 11/2001 | Demello et al. |
| 2002/0147766 | A1 | 10/2002 | Vanska et al. |
| 2002/0174073 | A1 | 11/2002 | Nordman et al. |
| 2003/0087652 | A1 | 5/2003 | Simon et al. |
| 2004/0122730 | A1 | 6/2004 | Tucciarone et al. |
| 2005/0164704 | A1 | 7/2005 | Winsor |
| 2005/0235030 | A1 | 10/2005 | Lauckhart et al. |
| 2005/0271016 | A1 | 12/2005 | Kim et al. |
| 2006/0026438 | A1 | 2/2006 | Stern et al. |
| 2006/0123105 | A1 | 6/2006 | Parekh et al. |
| 2006/0174028 | A1 | 8/2006 | Zhu |
| 2006/0184670 | A1 | 8/2006 | Beeson et al. |
| 2007/0008885 | A1 | 1/2007 | Bonner |
| 2007/0016918 | A1 | 1/2007 | Alcorn et al. |
| 2007/0088821 | A1 | 4/2007 | Sankuratripati et al. |
| 2007/0100653 | A1 | 5/2007 | Ramer et al. |
| 2007/0150349 | A1 | 6/2007 | Handel et al. |
| 2007/0164902 | A1 | 7/2007 | Bang et al. |
| 2007/0189473 | A1 * | 8/2007 | Altberg et al. ........... 379/114.13 |
| 2007/0244750 | A1 | 10/2007 | Grannan et al. |
| 2007/0255701 | A1 | 11/2007 | Halla et al. |
| 2007/0260519 | A1 | 11/2007 | Sattley et al. |
| 2008/0028067 | A1 | 1/2008 | Berkhin et al. |
| 2008/0103850 | A1 | 5/2008 | Shen |
| 2009/0048911 | A1 | 2/2009 | Shenfield et al. |
| 2009/0129377 | A1 | 5/2009 | Chamberlain et al. |
| 2009/0138427 | A1 | 5/2009 | Kalavade |
| 2009/0138446 | A1 | 5/2009 | Kalavade |
| 2009/0138447 | A1 | 5/2009 | Kalavade |
| 2009/0138593 | A1 | 5/2009 | Kalavade |
| 2009/0181649 | A1 | 7/2009 | Bull et al. |
| 2009/0210928 | A1 | 8/2009 | Ourega |
| 2009/0247193 | A1 | 10/2009 | Kalavade |
| 2009/0248680 | A1 | 10/2009 | Kalavade |
| 2010/0031274 | A1 * | 2/2010 | Sim-Tang ..................... 719/318 |

FOREIGN PATENT DOCUMENTS

WO   WO-2009/120892   10/2009

OTHER PUBLICATIONS

International Search Report and Written Opinion, International Patent Application No. PCT/US08/85000, mailed Jan. 28, 2009 (8 pages).

International Search Report and Written Opinion issued for PCT/US2009/038443, dated May 27, 2009, 6 pages.

* cited by examiner

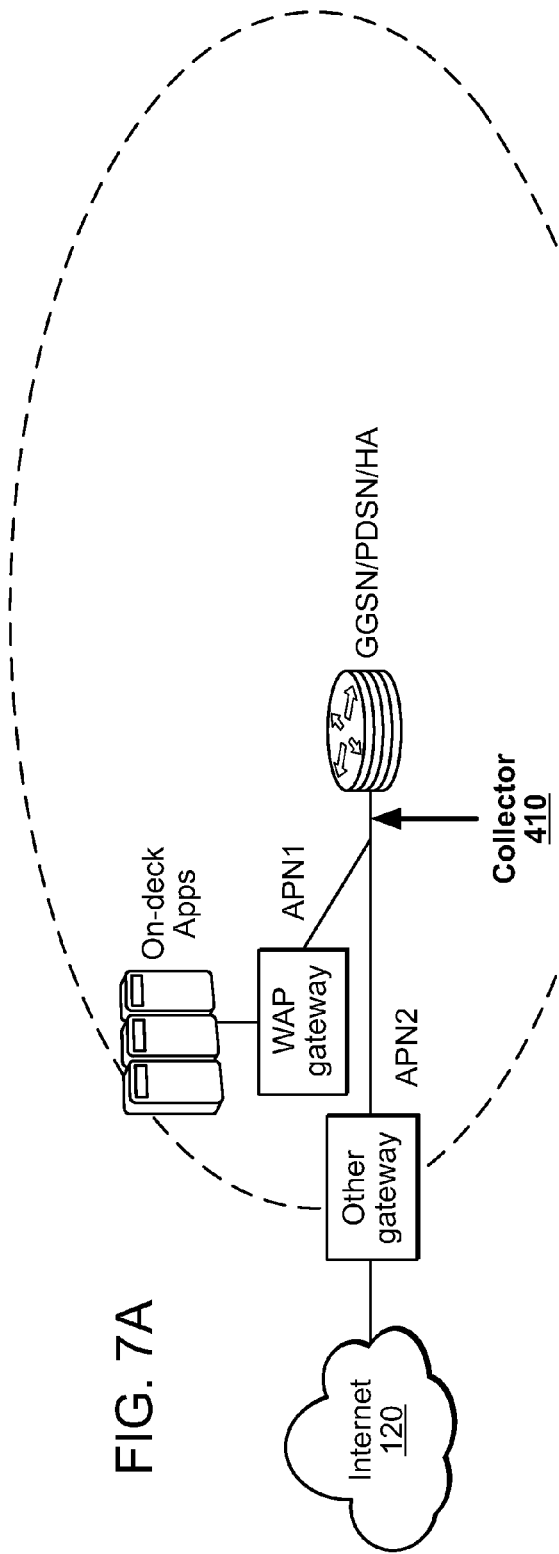
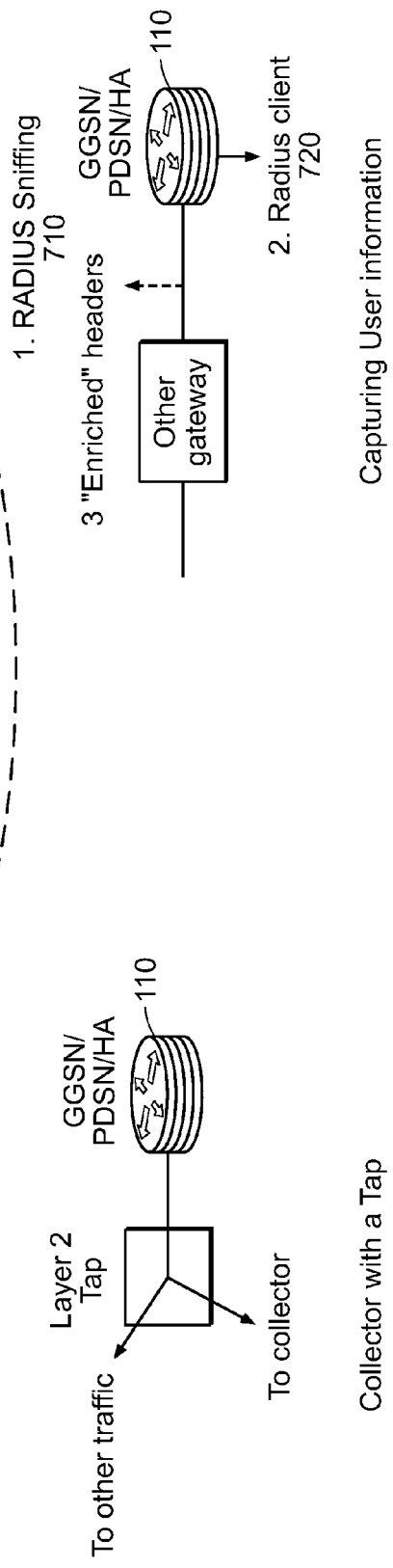

METHOD AND APPARATUS FOR STORING DATA ON APPLICATION-LEVEL ACTIVITY AND OTHER USER INFORMATION TO ENABLE REAL-TIME MULTI-DIMENSIONAL REPORTING ABOUT USER OF A MOBILE DATA NETWORK

CROSS REFERENCE TO RELATED APPLICATIONS

This application claims priority under 35 U.S.C. §119(e) to U.S. Provisional Application Ser. No. 60/990,328, filed on Nov. 27, 2007 entitled "Method and Apparatus for Providing Contextual User-Level Real-Time Visibility Into Mobile Content Consumption," the disclosure of which is hereby incorporated by reference in their entirety.

This application is related to U.S. Provisional Application Ser. No. 61/039,436, filed on Mar. 26, 2008, entitled "Method and Apparatus for Real-Time Brokering of Mobile Subscriber Information for Personalizing of Advertising and Content," the contents of which are incorporated by reference in its entirety.

This application is related to the following applications filed concurrently herewith, the entire contents of which are incorporated herein by reference:

U.S. patent application Ser. No. 12/324,672, entitled "System and Method for Collecting, Reporting and Analyzing Data on Application-Level Activity and Other User Information on a Mobile Data Network;"

U.S. patent application Ser. No. 12/324,675, entitled "Method and Apparatus for Real-Time Collection of Information About Application Level Activity and Other User Information on a Mobile Data Network;" and U.S. patent application Ser. No. 12/324,611, entitled "Method and Apparatus for Real-Time Multi-Dimensional Reporting and Analyzing of Data on Application Level Activity and Other User Information on a Mobile Data Network."

BACKGROUND OF THE INVENTION

1. Technical Field

The present invention relates generally to mobile networks and specifically to a method and apparatus for a real-time, transparent, network-based approach for capturing multi-dimensional user-level usage information on usage of content and providing correlated real-time reports.

2. Discussion of Related Art

Traditionally, mobile operators have had very tight control on the content that was being accessed on their networks and used to limit user access to a 'walled garden' or 'on-deck content'. This was done for two reasons: to optimize their network for well-understood content, and to control user experience. With the advent of more open devices and faster networks, there is an increasing trend in the mobile community to access 'off-deck' or 'off-portal' content, which is content generally available on the Internet at large and not preselected content hosted by the operator. This movement is generally troubling to service providers for two reasons. First, service providers have very limited visibility in the usage of off-deck content and hence they don't have the ability to design and optimize their networks for this usage. Further, they also no longer have the ability to control what their users access and hence they fear becoming 'dumb pipes' and not participating in the whole movement towards advertising and monetizing Internet content.

Content providers on the other hand, are interested in the potentially huge increased customer base of mobile users. Further, the mobile device is highly personal and by getting specific information about users such as location, demographics, usage patterns, etc. they can generate very targeted content and advertising. However, they too lack detailed visibility about mobile users or about what is happening in the mobile network. While a client on the mobile handset could provide some of this, they can't put clients or other applications into mobile devices easily to get additional data since these devices are still fairly rudimentary in comparison with a PC. Also, due to the traditional lock-in on the devices form a mobile operator, the client on the device may not provide all the detailed information. For instance, user location is not easily exposed by carriers since they are concerned about privacy and its usage and also since its such a critical part of the carrier data. Recent developments such as the Android open platform from Google are attempts to open up some of this information. However, it is still up to the carriers to allow these devices on their networks and for device manufacturers to use this platform. Further, this restricts the ability of data collection only to the new devices that embrace this platform—a carriers network will continue to have many other devices as well.

A key requirement to enable these two silos—mobile carriers and content providers—to jointly evolve the mobile content ecosystem is to mine and share mobile content usage effectively. By getting visibility into off-deck mobile content usage, mobile operators can optimize their networks. Mobile carriers are sitting on a goldmine of data that includes user's location, access patterns, demographic information, etc. By systematically sharing information between mobile operators and content providers, it is possible to offer very targeted and relevant content to the users.

Existing methods do not provide a method to capture user information transparently across multiple dimensions in real-time. The existing approaches can be characterized by several categories of solutions.

The first approach used by network based Deep Packet Inspection vendors (e.g. Ellacoya) is to capture information only around a couple of dimensions, including application and bandwidth. For example, it helps answer questions such as—what fraction of users are running what application, or what fraction of bandwidth is used by what application. Also, these approaches don't allow for storage and analytics on the data.

The second approach used by event monitoring products such as Vallent put probes in the network to capture events generated by other network elements—they do not actually capture live user-level session data or do any correlation.

A third approach by instrumentation companies like Keynote focuses on capturing on-demand measurements through their own devices emulating real-world testing. Their focus is on how applications run on different handsets, on different networks. They allow content providers and carriers to test mobile applications on 1000s of device profiles to make sure the application runs as expected. This is accomplished through virtual handsets deployed on the network. They also carry actual devices that can be to test applications. This "sampling" approach does not give specific user-level information that can be used for delivering a 'relevant' mobile experience.

A fourth approach by vendors such as Telephia/Nielson and Comscore/M:Metrics focuses on generated syndicated consumer research and panel based solutions. Their approach involves placing distributed monitors and collecting aggregated data for marketing and consumer usage characterization—they do no capture per-user data. Another approach is to place agents on the device to gather information. In either case, they don't collect from the network level and is hence restricted to collecting only representative data from field monitors.

A fifth approach used by traditional Web Analytics vendors (e.g. Omniture) relates to using logs on the application (e.g. HTTP). The traditional web approach does not work well for mobile applications for a number of reasons. First, this is restricted to a single application, which is HTTP. Mobile analytics requires a view across applications such as SMS, WAP, Downloads, etc. Further, these applications don't necessarily have logs and also logs tend to be time-delayed. Also, the web analytics tend to rely on client side support such as javascript, cookies, etc. which are not expected to be available universally on mobile devices. Unlike Web techniques, metrics such as unique user identifiers and location can't be derived for mobile devices from cookies or IP addresses. Cookies are not supported on mobile devices and IP addresses often tend to be masked when leaving the mobile network. Also, traditional web approaches to determine location through reverse IP mapping or other techniques don't apply since IP addresses are masked.

SUMMARY

The present invention provides a method and apparatus for storing data on application-level activity and other user information to enable real-time multi-dimensional reporting about a user of a mobile data network.

In one aspect of the invention, a data manager receives information about application-level activity from a mobile data network and stores the information so as to provide dynamic real-time reporting on usage of the network. The data manager comprises a database, data processing module, and analytics module. The database stores the application-level data for a predetermined period of time. The data processing module monitors the data to determine if it corresponds to a set of defined reports. If the data does correspond to the defined reports, the data processing module updates the defined reports accordingly. The analytics module accesses the database to retrieve information satisfying operator queries about network usage. If the operator chooses to convert the query into a defined report, the analytics module creates a newly defined report and populates it accordingly.

In another aspect of the invention, each defined report has a corresponding table that specifies the data to be automatically retained and updated.

In another aspect of the invention, the reports specify aggregate user-level data, including: the physical location of the users; demographic information about the users; content site accessed by the users; media type used by the users; device type used by the users; and network type used by the users.

In another aspect of the invention, the data manager uses IP address-mobile phone number pairings to query carrier information about the users, and augments the application-level data with the carrier information.

In another aspect of the invention, the analytics module compares an operator query to the defined tables to determine whether any of the tables contain data to satisfy the query. If no relevant tables exist, the analytics module creates a new table to satisfy the operator query and modifies the set of defined reports to include the newly created report.

BRIEF DESCRIPTION OF THE DRAWINGS

For a more complete understanding of the present invention and the advantages thereof, reference is now made to the following descriptions taken in conjunction with the accompanying drawings, in which:

FIG. 7 shows two specific architectures for collector deployment;

DETAILED DESCRIPTION

Preferred embodiments of the invention provide a monitoring platform that provides monitoring and analytics in mobile data networks. The analytics are related to a number of dimensions that characterize such a system. The system and method monitor application level (e.g., layer 7) events and activity transparently and in real-time, and allow the activity to either be aggregated or correlated with specific user (e.g., phone number). This method and apparatus may be used to effectively mine a carrier's network to collect user-level mobile data usage information in order to provide in-depth real-time visibility into usage for both carriers and content providers.

The system and method are network-based, non-intrusive, transparent, and client-less. The data includes but is not limited to the user's identity, demographic information, physical location, content accessed, media type, content classification, usage patterns, device type, network speed, etc. The system and method may correlate these multiple dimensions to generate a single anonomized description of the content session, in real time. The collected information can be used to feed advertisers in real-time for targeted advertising and also for getting aggregated data for optimizing mobile networks and applications.

The design allows collection of different types of data applications, including but not limited to HTTP, WAP, SMS, Video, Audio, Radio, Streaming, Gaming, and other applications. The design also allows correlation of the users' IP address with the mobile number, thereby getting access to the user's demographic information associated with mobile number. Moreover, the design allows using the phone number to get an approximation of the user's home location. Under one embodiment, the generated reports comprise aggregate data, without exposing user-specific information.

Among other things, the design allows the data to be used for:
  (a) Providing detailed visibility to the service provider so that the service provider can optimize their network and improve user experience and reduce costs
  (b) Providing detailed visibility to the service provider so that the service provider can determine appropriate content relationships to increase usage on their network
  (c) Providing detailed visibility to content providers so that content providers can tailor and adapt their content and delivery accordingly
  (d) Providing detailed real-time visibility to advertisers so that they can insert appropriate targeted advertisements into the user's content. This can be used to individualize the user experience with the most relevant information and thereby also improve the monetization of the content.

Figure 1:
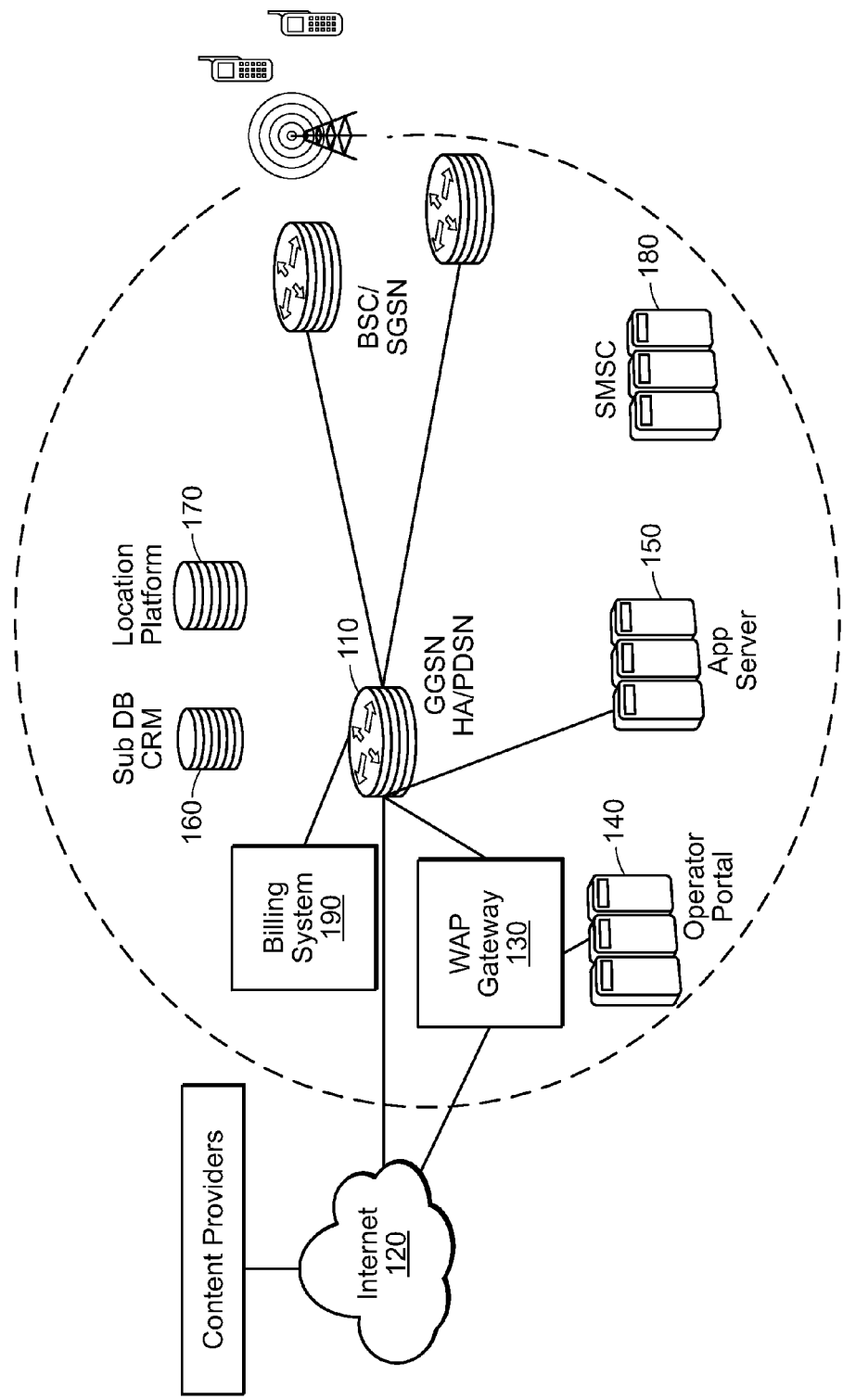
FIG. 1 shows the different elements in a mobile data network.

FIG. 1 shows the overall context of the preferred environment of this invention in a mobile data network. A generic architecture is shown, which could map to either GSM or CDMA technologies. Mobile devices connect through the base stations and the mobile data core through a router Gateway GPRS Serving Node (GGSN), Packet Data Serving Node (PDSN), Home Agent (HA) GGSN/PDSN/HA 110. The GGSN is in a GSM network. In a CDMA network, the devices connect through a PDSN/HA. In case the network is based on simple IP, there may not be a HA but just a PDSN. The mobile data request may be sent to content and application servers outside the mobile network 120 (this is often referred to in the industry as "off deck" or "off net") or to an operator portal 140 via a WAP gateway 130. The data request may also be to application servers 150 which may be internal or external to the operator. The data at the output of the GGSN 110 thus comprises all types of data applications, including Web, WAP, video, audio, messaging, downloads, and other traffic. In addition, the mobile data network has a subscriber database 160 that manages subscriber information. This could also be a Customer Relationship Management (CRM) database or an Authentication, Authorization, and Accounting (AAA) server. The network also consists of a location platform 170. Other types of data sources could be Short Messaging Service Center (SMSC) 180 that manages messaging traffic. The Billing System 190 manages the billing information for user services.

Figure 2:
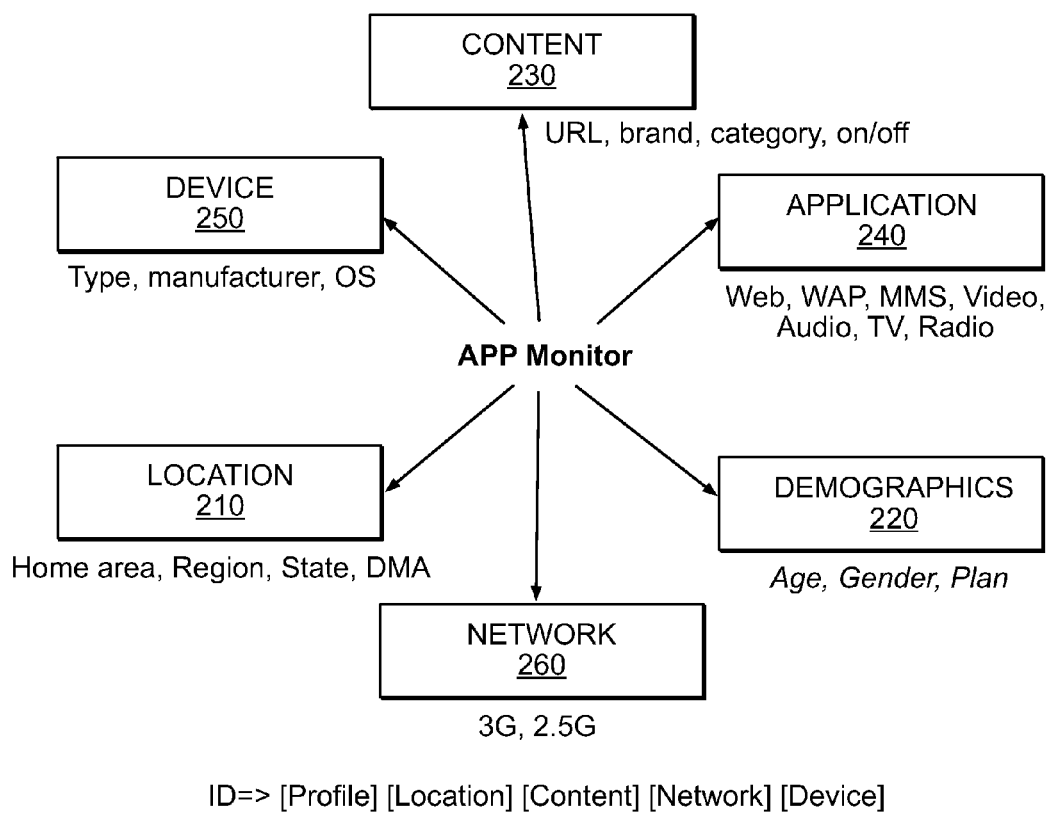
FIG. 2 shows the different dimensions of mobile data usage which certain embodiments of the invention may report about.

FIG. 2 shows the details of the different dimensions across which user data can be characterized. For a specific user IP address retrieved from the session request from the device, the monitoring platform collects user information across multiple "dimensions", including Location 210, Demographics 220, Content type and classification 230, Application or Media type 240, Device type 250, and network type 260. Further, historic information about a user can be collected to develop user profiles. Details of these dimensions are given next. Each dimension may have several attributes, as is shown below each dimension.

1. Physical Location (Region, State, Cell Site, detailed latitude/longitude level): The user's current physical location is collected. Depending on the level of granularity available, the location could be at a cell-site level or right at the lat/long level. This information is collected from the Home Location Register (HLR) or a Location Based Services (LBS) platform by indexing for the user's mobile number. This information is used to provide detailed targeting of content and advertisements to the user. This information is the most precious piece of information that is only available by virtue of the user being on a mobile network. For instance, in the case of a DSL or cable modem, it is possible to retrieve the user's physical location or home address—but it is static and limits the amount of advertising possible. By getting the mobile location, it is possible to tailor the content and advertising to the user's current location. Note that if the user's accurate location is not available, an approximation can be obtained by using the user's phone number. The phone number gives the user's 'home location'. This helps figure out for a particular session, what general area is the user's 'home area'. Further, sometimes the SGSN or PDSN identifier is also provided in the RADIUS message. This can be used to get an approximation of the user's location.

2. Demographic information: The user's demographic information includes elements like: Address, Gender, Income, Age, Marital Status, Education, Occupation, etc. This information can be collected from different sources, including a AAA database, a CRM system, or the HLR. Other information includes the user's rate plan. Similar to location, this information is used to target content and advertisements to the user. Just like location, demographic information is also uniquely available by being on a mobile network. The reason is that the user's mobile phone is very personal and can most often be associated with a specific individual, unlike a PC. Further, the mobile operator has very detailed information on the user as part of providing the subscription. As a result, demographic information is one of the key pieces of data that is obtained from being on a mobile network. Correlation of the demographic information with current location opens up a whole new dimension of personalization. Not that the demographics information in itself is not enough to characterize a user, especially given the 'family' plans. The CRM data often stores information related to the primary account holder. By tying in the other dimensions, a better profile of the user may be built.

3. Content site accessed (destination address) & classification: This captures the specific destination requested for this session, e.g. mobile.youtube.com and is obtained by parsing the session request. Content classification (details on content, sports/shopping/car-shopping, etc.) captures details on the type of content, which includes specific classification. For instance, shopping, news, games, social networking, movies, etc. This information could be inferred from the high-level content request. It is also possible to get more specific information from a content provider who can provide the high-level indexing of their content—since they probably already do this for advertising and internal reporting. This information is useful for specific advertisement targeting.

4. Media type (web, video, audio, gaming): This captures the type of application the user is accessing—web/WAP, video, audio, gaming, Peer to Peer, etc. Further, details such as the protocol used—RTSP, HTTP, MMS—can be captured as can details on the application requesting it (Flash, Real Player, etc.). This information is also available from details in the HTTP request.

5. Device type (capabilities of device, available applications): The type of device that was used to make the request is also retrieved. This is useful to understand capabilities of the device so content can be formatted appropriately. Typically the User Agent or UA characteristics can be derived from the request.

6. Network speed (capability of network the access is coming from): The network speed can be obtained by querying the mobile network databases such as the HLR for whether the user is on a 3G or 2.5G connection. In some cases this information can also be captured from the session request, depending on the protocol.

7. Usage history (historical usage patterns): The user's usage history is derived from local data in the Umber platform based on historical tracking. It includes types of sites visited, types of locations visited, or time of day behavior. While a specific content provider site has this information, what is unique about the monitoring platform is that it is now available across all content sites the user is accessing, without requiring each site to provide this information. This information can also be very useful for advertising across the user's interests.

Figure 3:
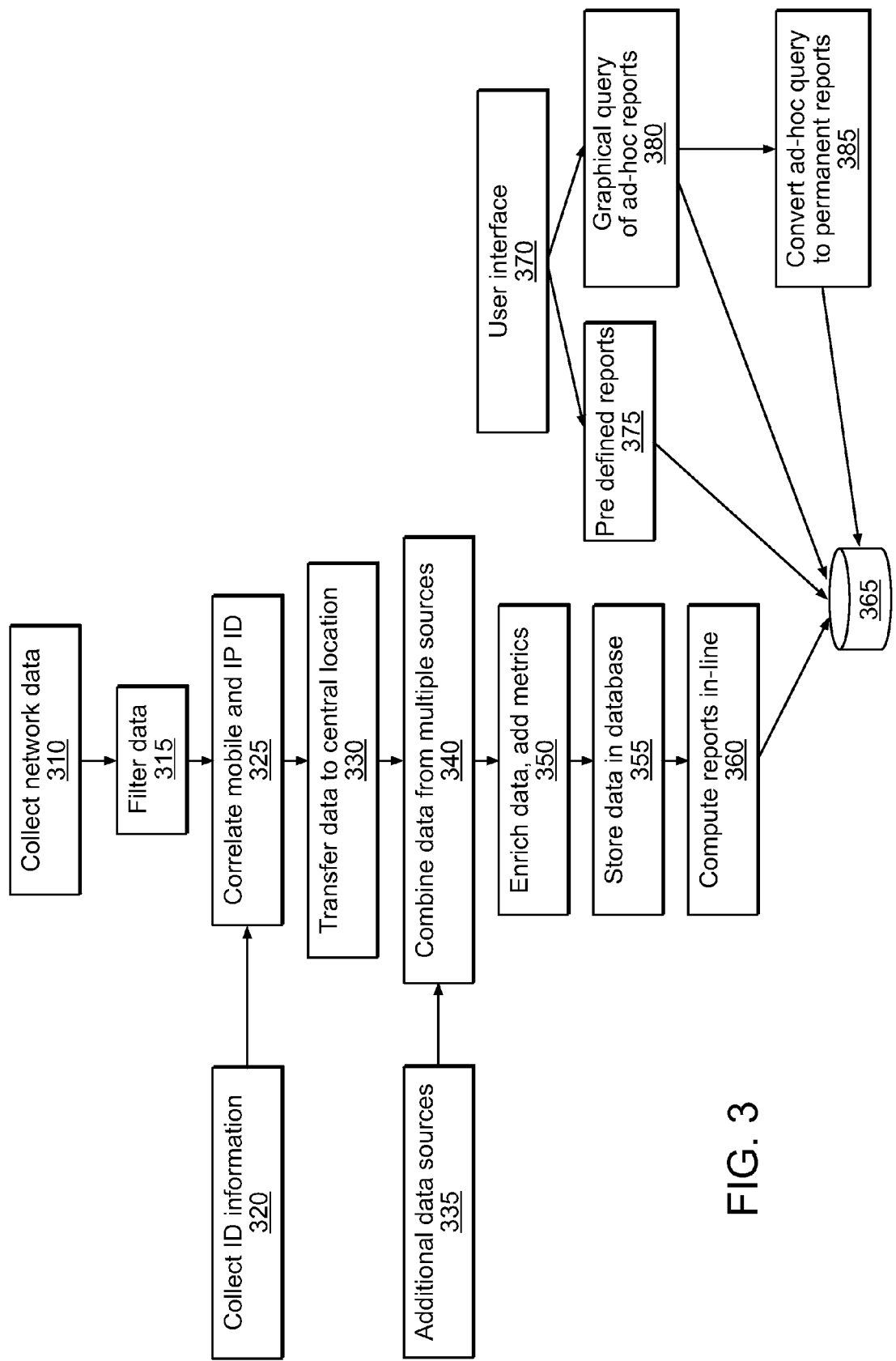
FIG. 3 shows the overall operation of the monitoring platform of certain embodiments.

FIG. 3 describes the overall operation of the distributed platform (Monitoring Platform).

Step 310 is the process of collecting data off the network. This includes collecting data at the output of the GGSN/HA 110 as shown in FIG. 1. Details of this step are provided further in FIG. 8.

Step 315 is the process of filtering out unnecessary data, such as management traffic on the wire, the actual body of the response, images, etc. A black list is defined to define the data that needs to be filtered out. In some cases an additional white list may be needed to define 'allowed' traffic. For example, all images may be on the black list, which images from specific 'advertisement' sources may be captured if one needs to capture ads.

Step 320 is the step of collecting user ID information. Note that the ID on the output of the GGSN/HA is typically an IP address. Information in the mobile network is typically identified through a mobile number. Step 320 relates to capturing the phone number. The mobile number is derived from a AAA database or by transparently monitoring (called "sniffing") IP address assignment requests from a RADIUS server. Further details on how this is accomplished are provided later in the document.

Step 325 relates to correlating the mobile number and IP address. Note that IP address assignments are typically dynamic and transient. Details on the correlation are described in FIG. 10.

Step 330 relates to transferring the filtered and correlated data to a centralized location. The frequency of the transfer can be controlled.

Step 340 relates to combining data from multiple collection sources such as step 330 above. In addition, this step would also involve getting data from additional sources such as logs, client generated data, feeds from other operator systems such as Subscriber data 160 in FIG. 1. Other sources might also be the SMSC 180 in FIG. 1. At the end of this step, all the relevant data 'events' from the data network have been captured.

Step 350 relates to augmenting the events with additional information. This includes enriching specific data from other feeds. For instance, the user's phone number may be used to look up the demographic information (e.g., by querying profiles and/or databases maintained by the carrier provider of the mobile data network), which can be added to the event data. In addition, metrics are computed on each event. Metrics include time spent and data consumed. The time spent metric allows computing how much time was spent on this specific event while data consumed captures the amount of data used in this event. Computing these metrics requires session state analysis whereby events belonging to the same session are identified. Events belonging to the same session are identified through the IP address. The time spent on a complete session as well as during sub-sessions can be computed. In addition, other metrics such as bandwidth consumed can be computed by monitoring all the sessions to and from a specific user session. The details of this step are provided in FIG. 14.

Step 355 involves storing this enriched 'event' data into the database.

Step 360 involves the database computing the reports results and aggregates as the data comes along. As a result, the reports are available in near-real time, unlike classic data warehouses that take hours if not days to process queries.

Step 365 involves storing the reports in a database.

Step 370 involves the step of the user of the system (e.g. a person within the service provider or content provider) using a UI to access the reports.

Step 375 involves the steps of the user requesting and the system presenting the pre-defined reports.

Step 380 involves the user specifying an ad-hoc query through a graphical user language.

Step 385 involves the system converting a selected ad-hoc query into a pre-defined report so in future it gets computed automatically as other pre-defined reports in Step 375.

Figure 4:
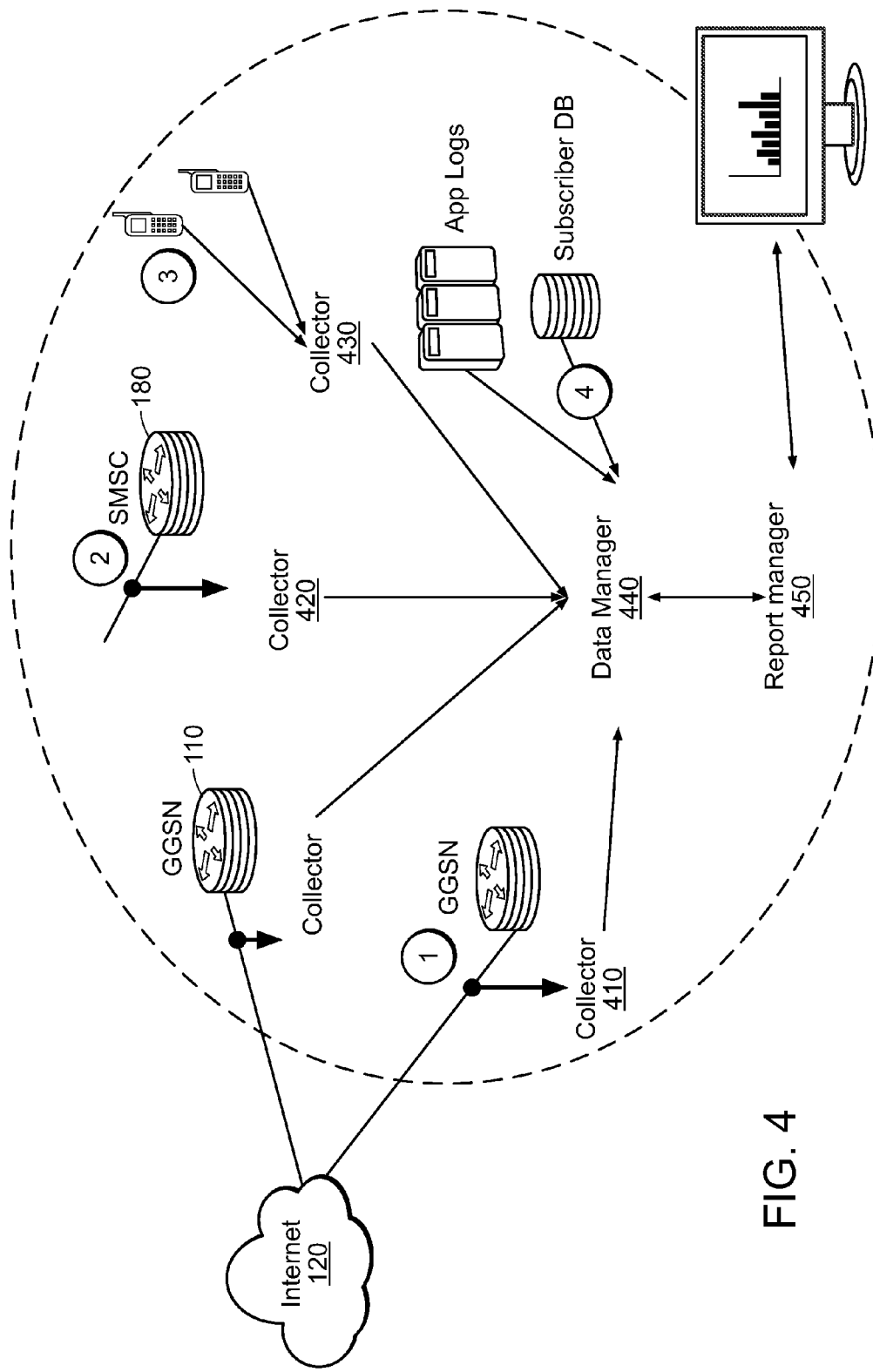
FIG. 4 shows different components of the monitoring platform of certain embodiments.

FIG. 4 shows an exemplary arrangement of collector devices in a mobile data network along with data managers and reports managers. The monitoring platform system comprises 3 elements:

1. Collector 410: This is the network element that collects data off the physical network segment, performing the functions 310, 315, 320, 325, and 330 in FIG. 3. Collectors 410 can be deployed at the output of the GGSN/PDSN/HA 110 of FIG. 1. In addition, collectors can also be deployed at a SMSC 420 or to collect data from clients as shown in 430. A typical deployment will have multiple collectors, typically one per GGSN/PDSN/HA. Additional details on the collector are provided in FIGS. 6-12;

2. Data Manager 440: This is the centralized store getting data from multiple collectors. This also performs the enrichment function from step 350 in FIG. 3. In addition, this includes the database and the associated report generation logic in steps 355 and 360 in FIG. 3;

3. Reports Manager 450: The Reports Manager provides the user interface and associated logic to provide the reports. The Reports Manager is accessed by people within a service provider or content provider through a thin client interface. The Reports Manager performs the functions 370, 375, and 380 in FIG. 3. The logic for step 385 in FIG. 3 is potentially split between the Reports Manager and the Data Manager.

In a typical deployment all the elements will reside within the service provider network. Specifically, the servers for the collector, Data Manager, and Reports Manager may be deployed in an operator datacenter. Collectors will typically be physically co-located with GGSN or PDSN/HA servers. The Data Manager and Reports Manager may be deployed in a central data center. Other deployment architectures are possible where the Data Manager and Reports Manager may be externally deployed outside the operator network or hosted by a third party data center. While the Data Manager and Reports Manager are shown as two physical in FIG. 4, there is no restriction on this physical implementation. For instance, the two functions may be combined into a single physical server in a deployment. Alternately, the Data Manager may be split into two physical servers where one does the Step 350 in FIG. 3 and the other does Step 355 and 360. Other implementations are also possible.

Figure 5:
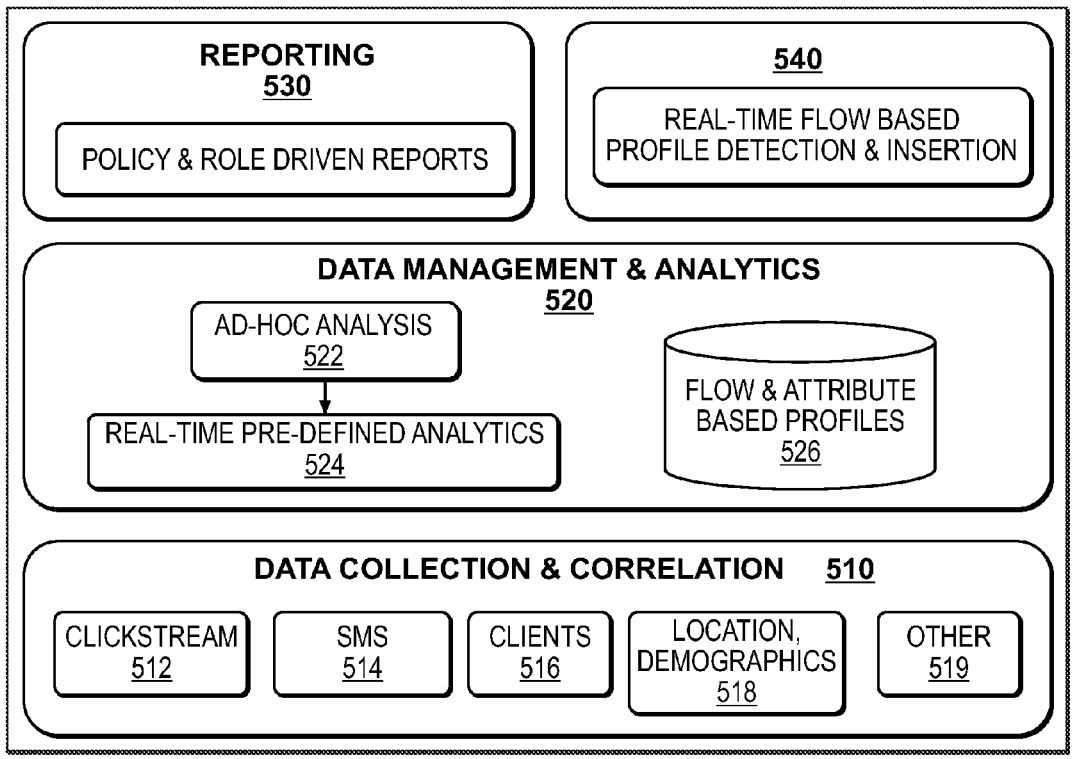
FIG. 5 shows the architecture for the monitoring platform of certain embodiments.

FIG. 5 shows the platform architecture for the monitoring platform. The platform comprises 4 layers:

Data Collection and Correlation layer 510 includes the collection functionality. This layer is designed so that multiple collection elements can be applied. While in preferred embodiments a network based collection out of the GGSN/PDSN 512 is used, other sources of data include SMS 514, client software on handsets 516, location, demographics, and other feeds 518. The architecture is flexible so that other feeds 519 such as application logs, feeds from data warehouses, other collection devices, etc. can feed into the same platform.

Data Management and Analytics layer 520 includes the pre-defined reports data 524 that is continuously available as well as the ability to support ad hoc analysis 522 as well the ability to convert 522 to 524. Other analytics can be built into the same platform. The data collected can also be used to build user profiles 526 as shown where user-level information may be collected.

Reporting layer 530: This includes the UI and the policy language to query the data.

In addition, layer 540 allows sharing the user-level information collected in 526 to be brokered with other applications such as advertisement targeting or marketing. Each of the elements are next described in more detail.

Figure 6:
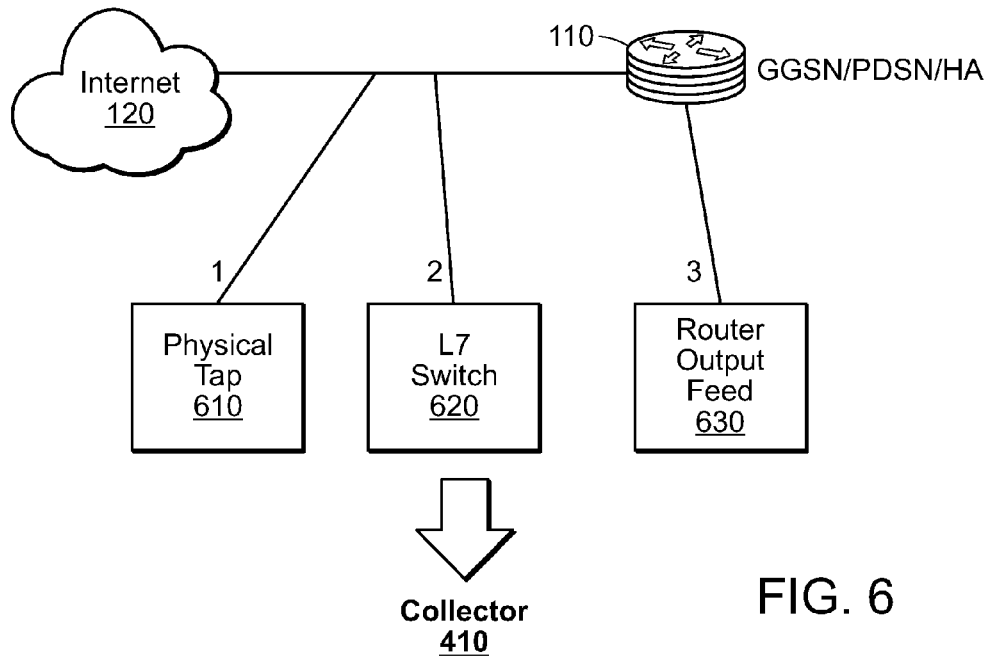
FIG. 6 shows different approaches to deploy the collector in a network non-intrusively.

FIG. 6 shows how a collector may be deployed in a typical operator network. Note that the techniques apply to both GSM and CDMA networks. The collector monitors the output of the GGSN/PDSN/HA 110 of FIG. 1 before it goes through any subsequent gateways. As a result it sees all the data traffic coming out of the mobile data network across all applications. Further, at this point in the network, the IP addresses are not masked by upstream proxies or gateways. The collector is designed to be deployed non-intrusively. Three possible, but not limiting, approaches are described. The first approach 610 involves a physical tap that splits the traffic to a second wire that allows the collector to sniff the data. The second approach 620 involves a Layer 7 switch or a port mirror on an existing router that can be directed to pass traffic to the collector. The third approach 630 shows that the GGSN itself may have the ability to mirror traffic or provide a feed to the collector. Many GGSN/PDSN/HA platforms have the ability to mirror traffic like this for applications such as wire tapping or for debugging. Further, it may also be possible to get data from a specific module within a GGSN by configuring the GGSN appropriately. This approach may be required if the GGSN masks or encrypts the data before sending it out on the physical network.

FIG. 7 shows additional details for the collector deployment. FIG. 7A shows the collector before other gateways. FIG. 7B shows a preferred embodiment where the data is picked off a layer 2 tap. FIG. 7C shows how the collector can also collect RADIUS traffic off the physical network 710 or by configuring the GGSN/PDSN to send a RADIUS feed to the collector 720.

Figure 8:
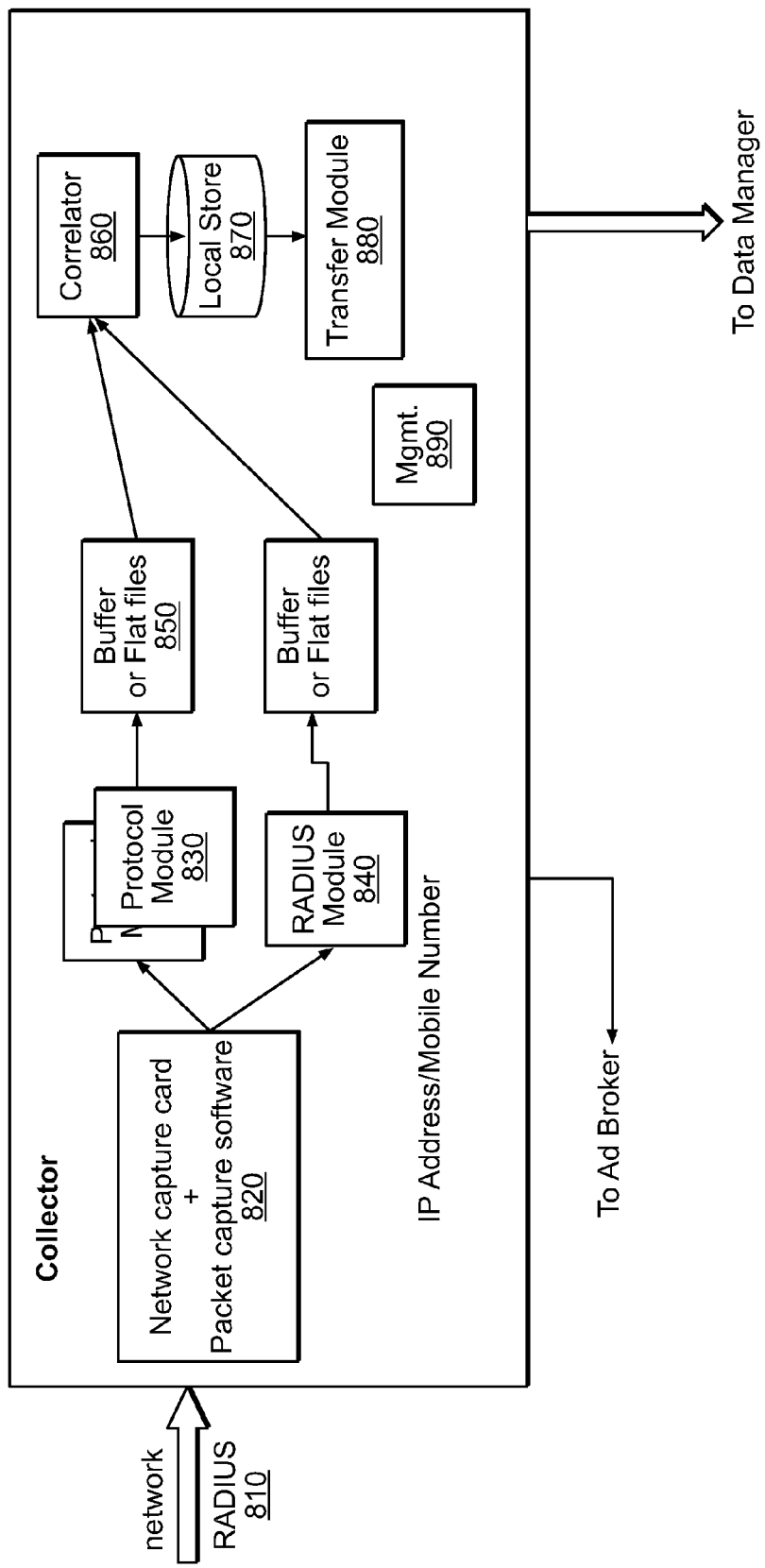
FIG. 8 shows a block diagram of the collector architecture.

FIG. 8 shows the internal architecture of the collector. The input to the collector 810 shows data coming in on a network interface. The network capture card 820 gets the relevant data off the wire with appropriate filtering. Note that it is not required to get monitoring or operations traffic: e.g. ARP, SNMP, etc. packets can be filtered before the data is read into the system. Note that the system may have a data capture card or just use a regular NIC. The output of 820 is fed to one or more protocol modules, depending on the type of data. Examples of protocol modules include HTTP, WAP, RTSP, SMPP, etc. The RADIUS module is an optional module that may get RADIUS traffic in one of the two approaches described in FIG. 7C. Data from the protocol modules is managed in internal memory 850. The correlator 860 maps the IP address to the mobile number. Details are provided in FIG. 10. The correlator output 870 is then stored in a local memory until the data is ready to be transferred to the Data Manager 895 via the Transfer module 880. In addition, the IP address/Mobile number mapping may also be used to broker real-time profiles for ad targeting. For example, for each IP address, the mobile number and associated profile data may be brokered to a different server. This brokering may be done out of band or in-line. As a result, a third party application or content provider can get details about an IP address for providing targeted content or advertisements.

Figure 9:
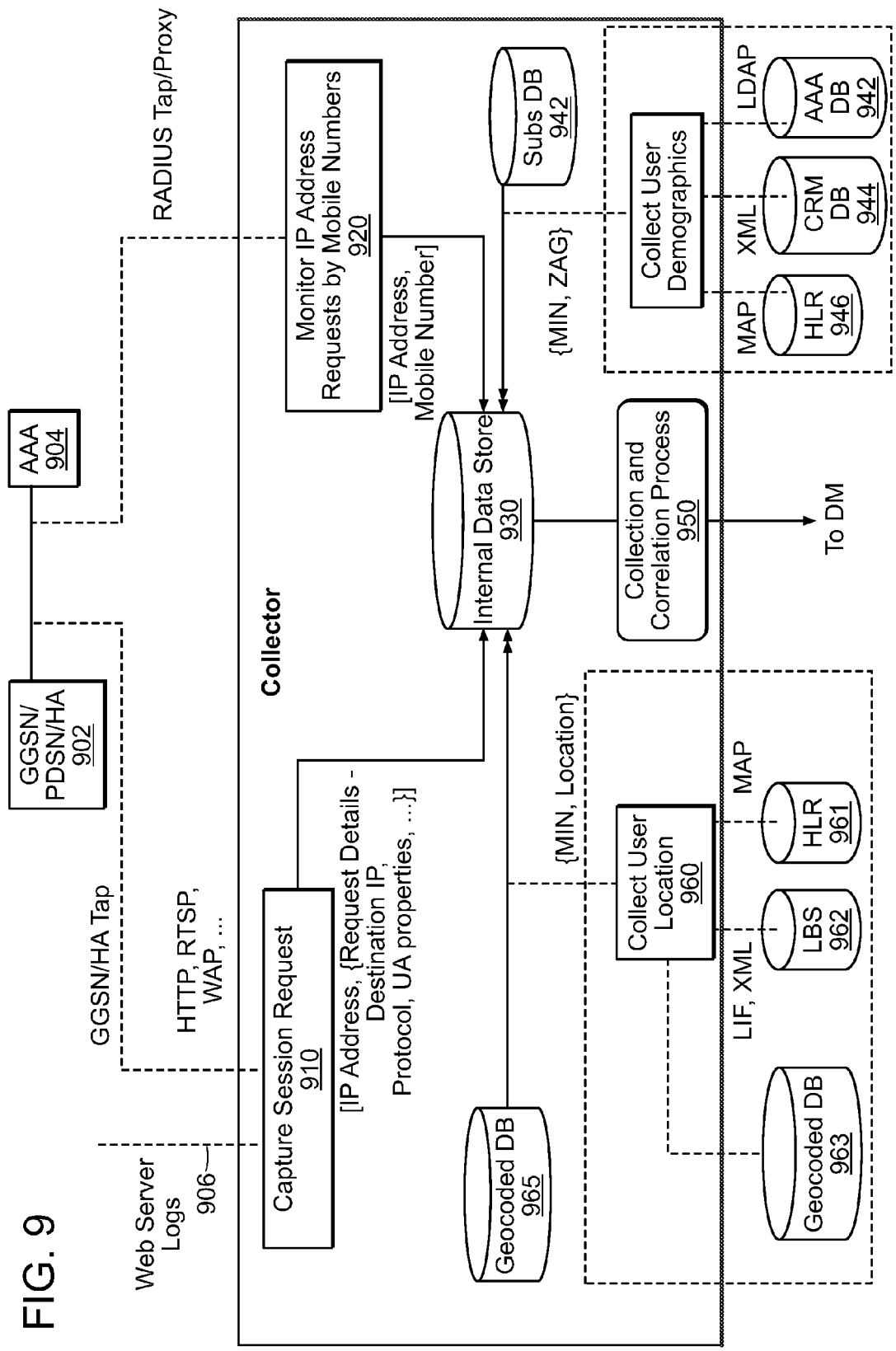
FIG. 9 shows the operational flow in the collector of certain embodiments.

FIG. 9 shows the internal operation flow for the collector.

1. The session capture module 910 continuously captures the session information for each new IP address in the system and sends it to the internal data store 930. The capture module 910 represents the functions performed by modules 820 and 830 in FIG. 8. As described earlier, the collector may be deployed through a tap 902. Alternatively, a switch in the network can be configured to replicate all traffic to a specific port on the switch. As a result, it can see all the traffic coming from the network. In another embodiment, the monitoring platform can get the session-level information from an existing mobile router such as a GGSN or a PDSN. In another embodiment, this information can be obtained from server logs from a content provider 906. The content session request information is collected continuously as session requests arrive from mobile devices.

2. The Mobile Number module 920 continuously collects the mobile number and IP address pair and saves it to the database 930 tagged by the IP address. Specifically, when a user's data session is established (PPP in CDMA or PDP context in UMTS), the entity creating the session requests an IP address. For instance, in CDMA, when the PDSN is creating a Point to Point Protocol (PPP) context, it queries the AAA for an IP address. Similarly, in UMTS, when a SGSN requests a Packet Data Protocol (PDP) session with the GGSN, the GGSN assigns an IP address. A similar approach may be used for other mobile networks such as Wimax. The PDSN/HA or GGSN in turn passes this IP address information via RADIUS to other servers. The monitoring platform monitors these requests to get the IP address-mobile number pair. More details are provided in connection of the description of FIG. 10. In another embodiment this information can be retrieved from a AAA database using a LDAP or RADIUS protocol, if it is designed to store the mobile number request. This depends on operator policies. In another embodiment this information can be obtained by the monitoring platform being a RADIUS proxy in between the GGSN and AAA or PDSN and AAA. This can then get access to the mobile number and IP address being requested. In another embodiment, this information can be collected by a transparent tap on the RADIUS server as well, to collect this information. The mobile number information is continuously collected as new session initiation requests are made from mobile devices. The monitoring platform tracks the IP address and the corresponding Mobile Number in its internal database.

3. The Location module 960 continuously collects the location information and maps it to a physical location for each new IP address detected coming on line. This information is retrieved using the mobile number and saved by the IP address. In one embodiment this information can be collected once every time a new session is created. In this case, the HLR or LBS platform is queried when a PDP/PPP context request is created. In another embodiment this information can be regularly polled at a configurable frequency from the HLR/LBS platforms 961. In another embodiment, if the platform allows pushing, this information can be pushed to the Monitoring Platform. If the information is to be collected from the HLR, typical MAP requests such as MAP_SEND_AUTHENTICATION_INFO and the corresponding response MAP_INSERT_SUBSCRIBER_DATA can be used for UMTS based networks. In CDMA based networks, messages such as MAP_QUALREQ may be used. If the information is collected from the LBS platform 961, protocols such as Location Interface (LIF), Lg interface, or other specific APIs may be used. This information is stored in the internal database against the user's IP address entry. The location information obtained from the LBS platform further needs to be mapped into information useful to the content providers, such as a zip code, postal address, or marketing area. This mapping can be done through a second dip into a geocoded database 963 or 965 for the latitude/longitude data. Similarly mapping a cell sector to a region can be done by using the mobile operator's information.

4. The Demographics collection module 940 continuously collects the user's demographic information for each new IP address/mobile number detected in the system. This information is captured from the carrier databases using the mobile number and stored into the database indexed by the IP address. This information can be cached for a configurable period and refreshes can be obtained beyond that period. Example sources of data include a subscriber database 942, HLR 946, CRM database 944, AAA database 942, etc. The information is collected from the Customer Relation Management (CRM) database 944 or through a Lightweight Directory Access Protocol (LDAP) database 942 or through the HLR 946. In this case, protocols such as XML, LDAP, or Mobile Application Part (MAP) may be used. The retrieved information is segmented into categories based on age, gender, income, etc. and a single category identifier may be stored internally to allow anonomization. This information is typically collected every time a new mobile number is received. Examples of categories include: {[18-25 yr, male], [18-25 yr, female], [25-35 yr male], [25-35 yr, female], [35-55 yr, male, middle income], [35-55 yr, female, middle income], [over 55 male], [over 55 female]}. Other dimensions such as education, occupation, can be added.

Other information such as the device type, network speed, network type etc. can be obtained from the information already collected. For instance, the content request contains the User Agent information, which gives details on the device. The network type can be obtained from the other HLR data retrieved.

These four processes (910, 920, 940, and 960) run independently on the collector device and the data collection module collects and correlates the data and saves it into the database. The information from these processes is preferably collected prior to module 910 collecting session information. All the information is ready when the content request comes in, thereby making it possible to send the information in real-time.

In another implementation, the different modules could write the collected information to an internal database, either independent or shared. The Collection and Correlation Module can put the information together and write the result to the database.

In another implementation, the mobile number, location, and demographics information can be written to a database as collected. The real-time session information is sent to the Data Collection and Correlation Module, which correlates it with existing data to generate a real-time stream.

Figure 10:
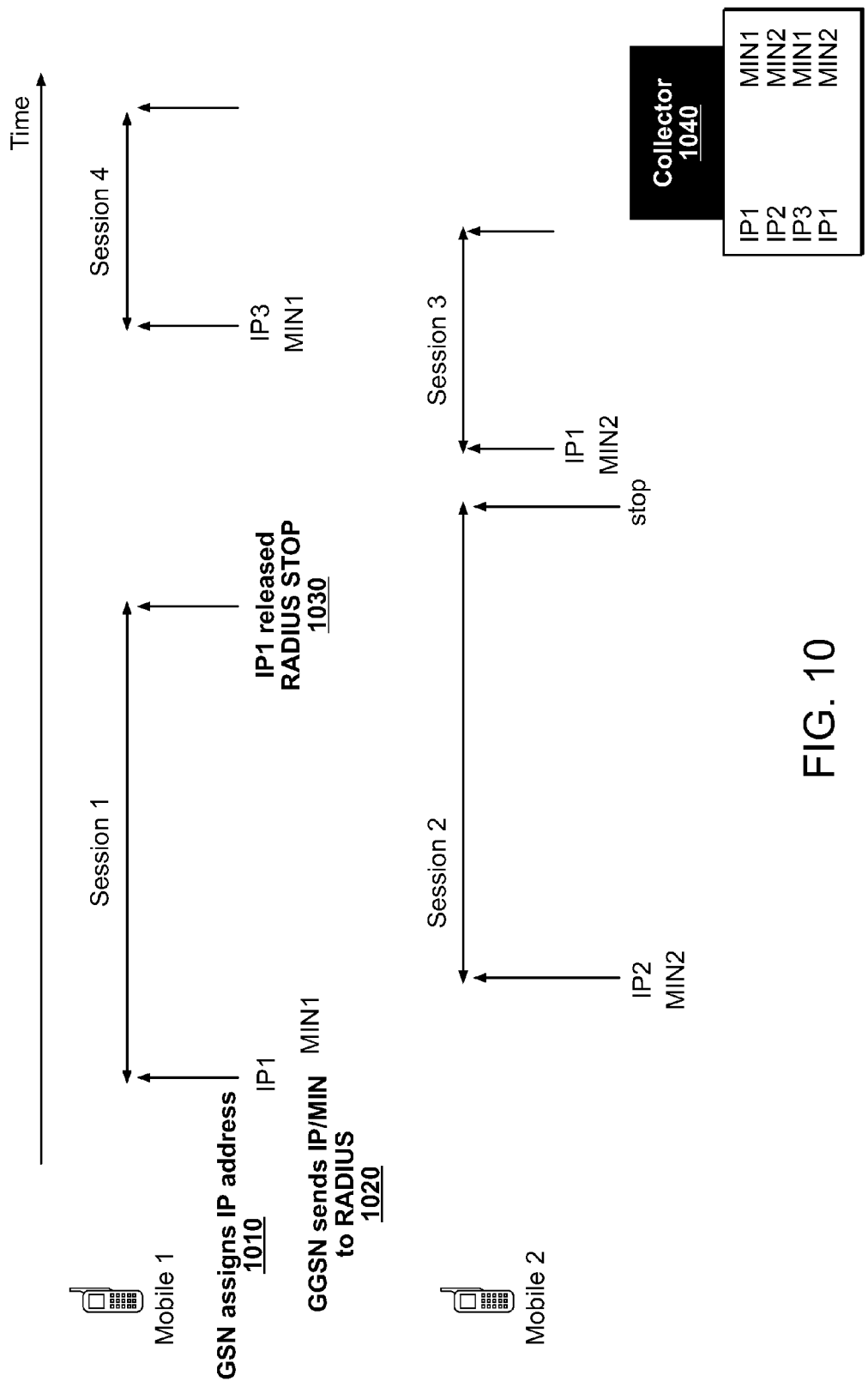
FIG. 10 shows mobile number to IP address correlation within the collector of certain embodiments.

The overall IP address assignment and mobile number or mobile identity number (also referred to as MIN) association is described in the following FIG. 10. As shown in the figure, the IP address is assigned by the GGSN/PDSN/HA 1010 and remains active for the duration of the session. The IP address is reassigned based on an inactivity timer, which is vendor- and operator-specific. Each session gets assigned a new IP address. The IP number to MIN mapping is sent to the RADIUS server through the START 1020 and STOP RADIUS packets 1030. The table 1040 shows how the collector can maintain a mapping between IP addresses and mobile numbers.

The mobile number can be obtained by the collector in one of several ways.

1. In general, when the PDP or PPP session is established, the GGSN/PDSN sends a RADIUS start/stop packet for accounting purposes. This message contains the MIN and possibly other user information. The collector can sniff the RADIUS traffic on the output of the GGSN/PDSN to get this information. This is shown in FIG. 1-C.

2. In most networks the GGSN can be configured to send a RADIUS start/stop packet with Vendor-Specific Attributes (VSAs) that capture user information (e.g. MIN, SGSN address for this session, and possibly other information.). This information can be sent to multiple recipients in the mobile network and the collector can be configured to be one such recipient. The specific VSAs are operator dependent. This will require specific information from the operator.

3. In some networks, the GGSN tends to provide "Enriched" headers to the traffic going into the "on-deck" destinations. This is usually operator and gateway specific and would require additional integration within an operator. This information may contain user ID, MIN, SGSN location, etc. This also works only for on-deck traffic, but could be a way to get additional information.

Figure 11:
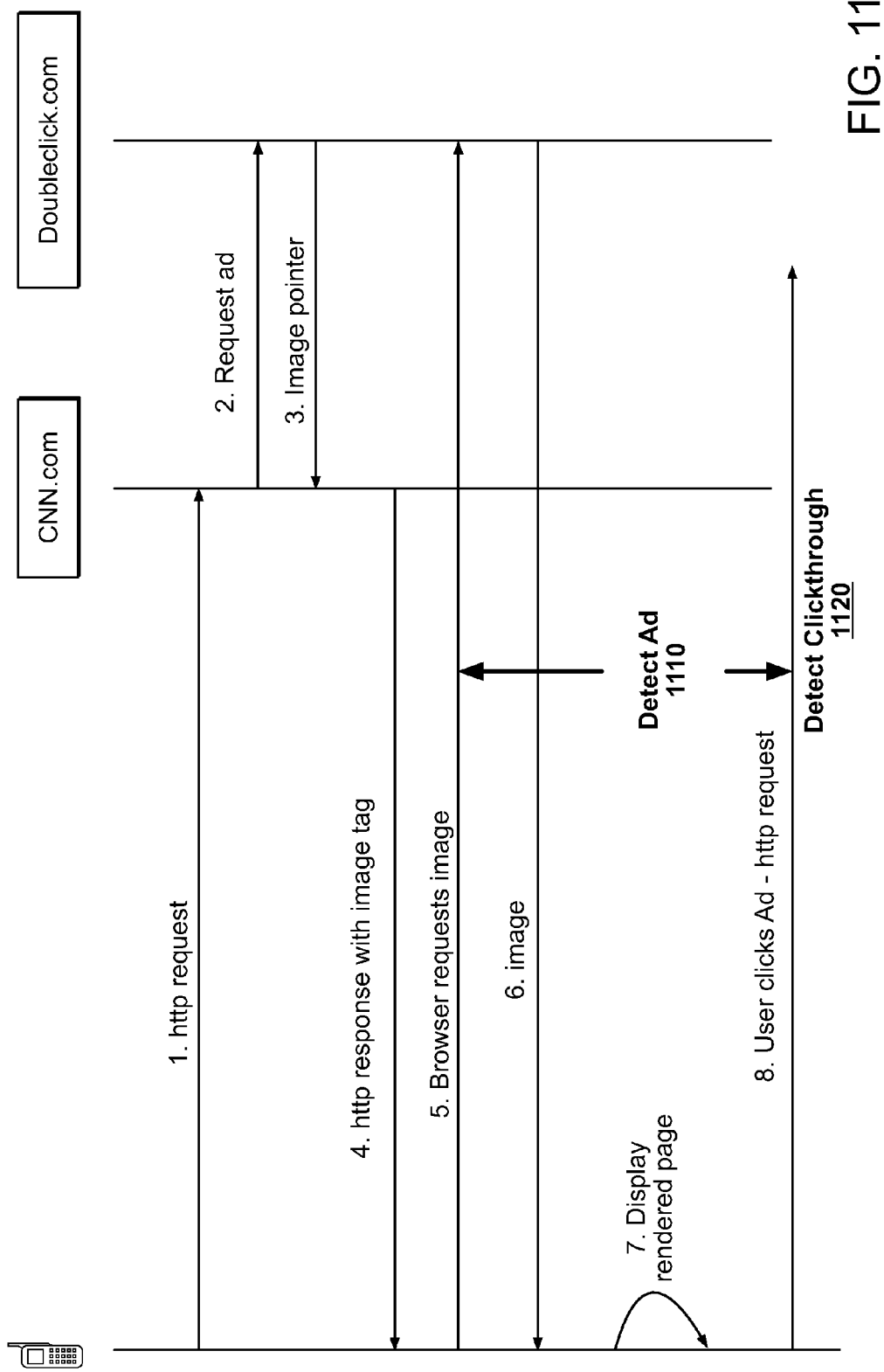
FIG. 11 shows message sequences that may be used to identify advertisements according to certain embodiments.

As mentioned in Step 315 of FIG. 3, the captured data is filtered before passing on to the Data Manager. While images in general can be filtered, it is required to capture advertisements or ads. FIG. 11 is a signaling diagram of layer 7 messages and shows how image advertisements can be detected.

1. The browser requests the original page.
2. The content site requests an ad from an ad server.
3. The server returns a pointer to the ad.
4. The content site returns a http response to the client with the image tag.
5. The client requests the link pointed to by the ad. By tracking accesses going to 1110 the collector can identify that an ad is being served.
6. The client renders the page locally.
7. If the user clicks on the ad, then there is a http request to the link pointed to by the ad. This allows the collector to track a click through. The Referer information is used to identify the URL that the ad was placed on.

Figure 12:
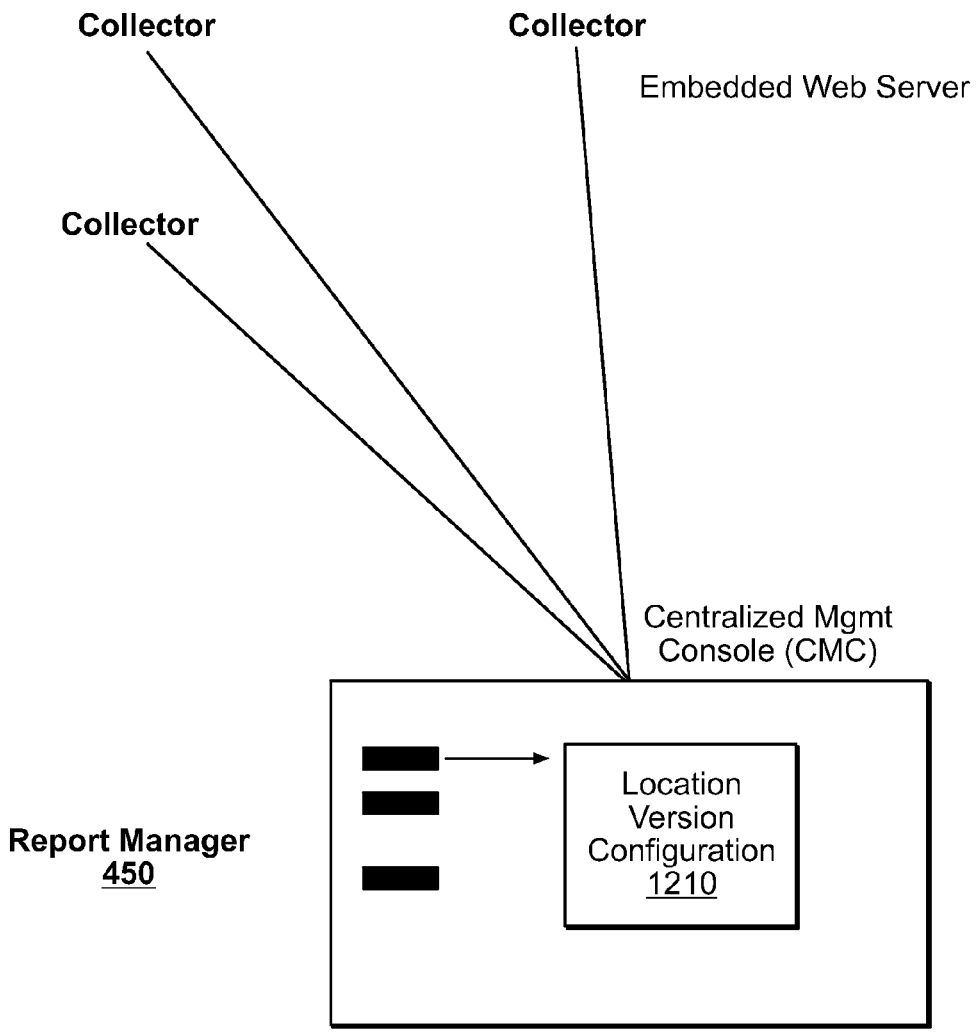
FIG. 12 shows the management architecture between collectors and a reports manager of certain embodiments.

FIG. 12 shows how multiple collectors can be managed through a centralized console. Each collector may have an embedded Web server and a centralized console will provide access to manage the collector parameters. This console allows configuring and monitoring each collector. Collector-specific parameters such as IP address, faults, and alarms may be monitored. Also, other parameters such as filters for which URL or which IP addresses to capture can also be specified through this interface. Further, the amount of data stored in a collector, the frequency with which it is transferred, whether or not it is masked, are other configuration parameters.

Figure 13:
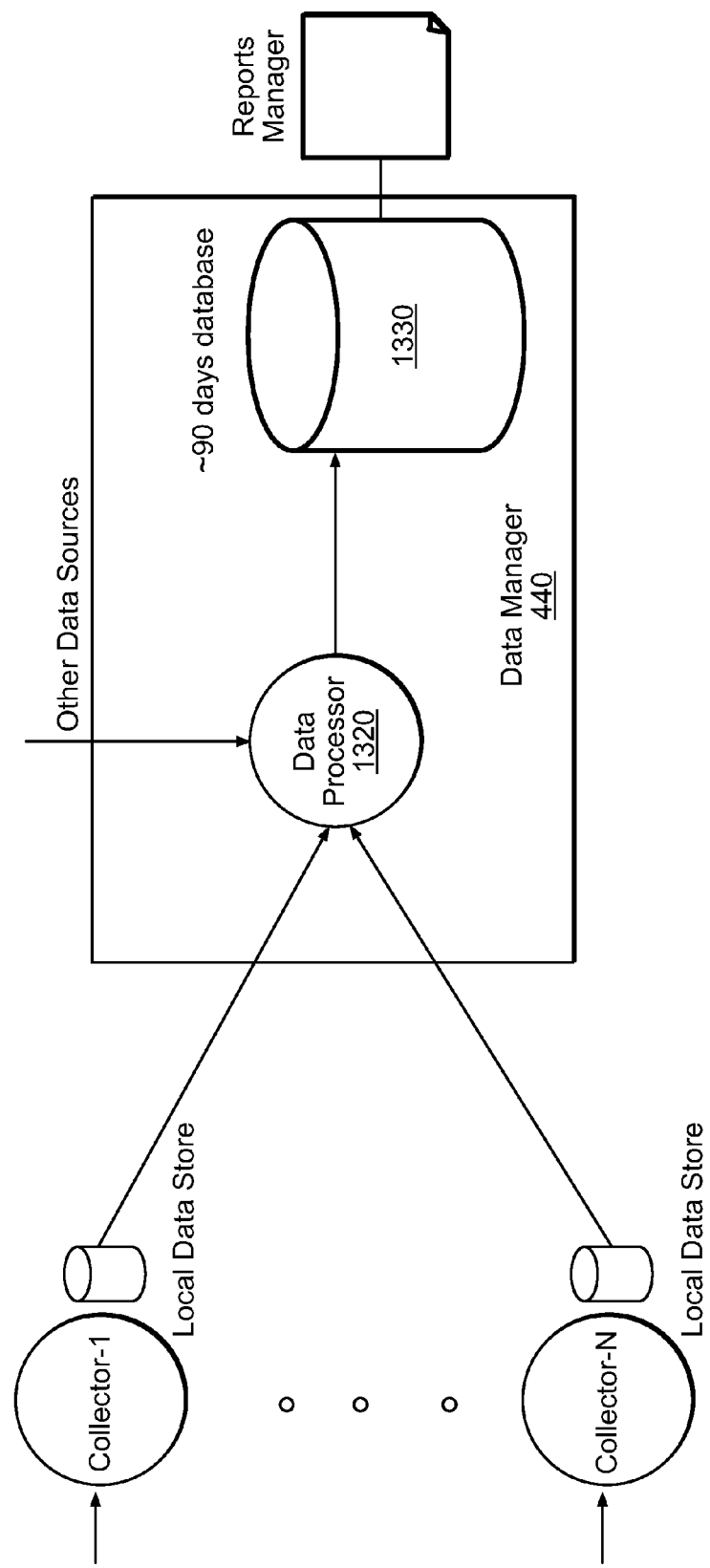
FIG. 13 shows the block diagram of the data manager of certain embodiments.

FIG. 13 shows how the data from the collector is further passed on to the Data Manager. Multiple collectors can feed the Data Manager 1310. The Data Manager comprises two key modules, the Data Processor 1320 and the Database or Data warehouse 1330. The Data Processor is responsible for collecting the data from multiple collectors, augmenting it with additional information, and storing it into the database per steps 335, 340, and 350 in FIG. 3. The database is the core storage module that holds the report and event data. The database is accessed from the Reports Manager.

One of the characteristics of the monitoring platform is that it combines both reporting and analytics within a single platform. This core feature drives the architecture of the Data Manager. Specifically, the monitoring platform supports two types of reports.

1. Pre-defined reports: This is a set of reports that is pre-defined across different dimensions. The data for all these reports is generated through aggregation and rollups frequently. As a result, these reports are available whenever the user accesses the system.

2. Ad-hoc reports: While the pre-defined reports are expected to cover 90% of the use cases, the system needs to be flexible enough to support any ad-hoc report. However, to optimize on the overall system cost, the amount of 'detailed' data is stored is limited to a specific interval. This allows the user to run any ad-hoc query in real-time. Since this query is on limited data, the system allows the user to add such an ad-hoc report to its set of selected reports for subsequent usage. The underlying design allows such an ad-hoc report to become a pre-defined report without requiring any manual customization.

Figure 14:
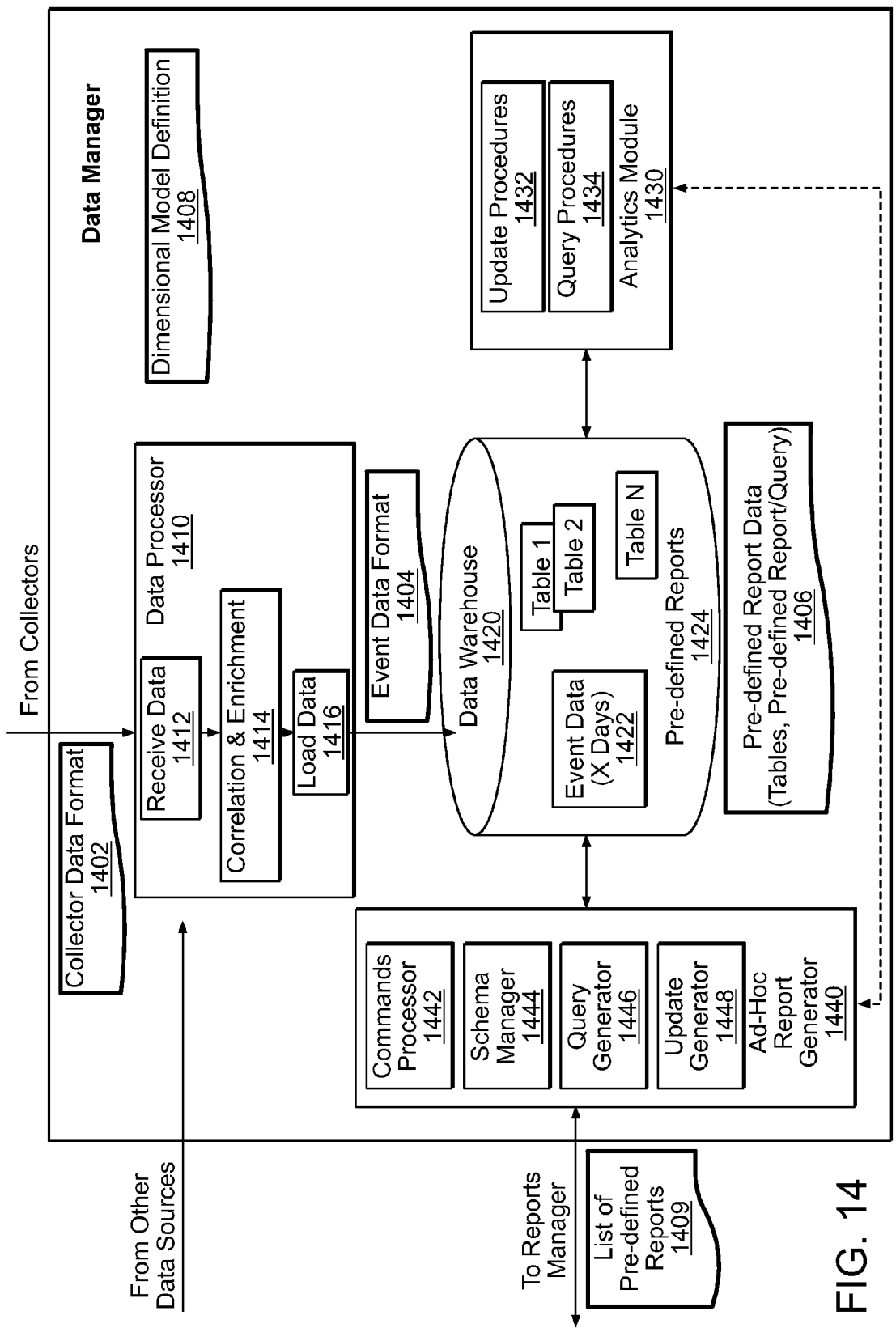
FIG. 14 shows the internal architecture of a data manager of certain embodiments.

FIG. 14 shows more details within the Data Manager.

The Data Manager is built on some system-specific schema, which is described below.

1. System-level Dimensional Data Definition 1408: This is a system-level definition of all the dimensions and attributes in the system. For example, dimensions include: Content, Device, Demographics, Location, etc. Each dimension may have additional attributes, for instance, device attributes include type, manufacturer, etc.

2. Collector Data Format 1402: This defines the format for the data sent from the collectors to the DM.

3. Event Data Format 1404: This defines the schema for storing the detailed event data within the warehouse. The ETL process in the DM (called Data Processor) converts the data from the collector Data Definition format to the Event Data format, adding additional fields as required.

4. Pre-defined Report Data 1406: This contains the data that describes the pre-defined reports in the system. Specifically, it includes the definition of the pre-defined tables in the Data warehouse as well as a list of the procedures available to update and query the tables for generating the pre-defined reports. Note that as new reports are added to the system from new adhoc queries, this pre-defined report data gets updated.

5. List of pre-defined reports 1409: The list of pre-defined reports specified in the Data Manager is also tracked in the Reports Manager. The Reports Manager builds this list by synching the data from the Pre-defined Report Data in the Data Manager. This list includes the definition of each report as well as the query procedures used to build the data for that report.

The Data Manager comprises 4 key modules: Data Processor 1410, Data warehouse 1420, Analytics Module 1430, and Ad-hoc Reports Generator 1440.

1. Data Processor 1410: This module is responsible for receiving data from collectors (step 1412), correlating it with any additional data (step 1414), inferring other information from this data, and storing it into the Data Store in the appropriate schema for the detailed data (step 1416). This module has 3 functional components:

1) Receive data 1412: This is the process that gets data from different collectors. The data format for this data is defined as the collector Data Format;
  2) Correlation and Enrichment 1414: This process takes each event and augments it with additional information. For example, it could add other information to the data such as demographic information obtained from a CRM feed at the DM. In this case, it would take the collector event, see the phone number, and add the demographic information for this phone number to augment the information obtained from the collector. Additionally, it could infer other information on the data. For instance, the collector data would specify the URL and the Data Processor would then map it to a specific category based on a definition file (e.g. Entertainment). The result of this step is that each Event from the collector is characterized by all the parameters and the 'enriched' data is now ready to be loaded into the database. In addition, the process could add additional metrics to enrich the data. Typical metrics would include data consumed, time spent, etc.;
  3) The Load process 1416 loads the Event data into the data warehouse per the schema, which is defined in the Event Data Format.

2. Data warehouse 1420: This is the core database, which manages the storage of the data. This stores the data in two forms: (a) basic 'event' data (detailed data) 1422, (b) aggregate tables that are defined based on the pre-defined reports 1424. The Data warehouse is queried by the Reports manager through a standard interface. The Event Data Format stores the description of the data warehouse schema for the Event data and the Pre-defined Reports Data file stores information about aggregate tables corresponding to the pre-defined reports.

3. Analytics Module 1430: This module comprises the procedures that manage the update and query of the different tables:

1) Update Procedures 1432: Specifically, the detailed event data is used as the 'scratch pad' or 'staging area' for updating the aggregate tables. The update procedures will either be called from within the database periodically as the event data is loaded into the database or they may be called by the Data Processor. If a new table is defined as part of scheduling a new report, a new update procedure may be programmatically generated and added to this list of procedures;
  2) Query Procedures 1434: This includes the procedures used to query the data. These include both the pre-defined procedures for the reports available as part of the base system as well as any new procedures that are created as part of scheduling new reports.

4. Ad-hoc Reports Generator: This module supports the programmatic generation of new tables and aggregates based on requests from the Reports Manager to generate new reports based on ad-hoc queries:

1) The Commands Processor 1442 parses the request from the Reports Manager for creation of 'new' reports;

2) The Schema Manager 1444 generates new tables based on the request. This process also updates the Pre-defined Report Data with information about the new table. The Schema manager knows how to create a new table by comparing the dimensions and metrics required in the query with the dimensions and metrics available in the existing tables.

3) The Query Generator 1446 creates new queries to retrieve data from the newly created tables. These queries are then added to report-query list managed by the Analytics Processor;

4) The Update Generator 1448 creates new procedures to generate aggregates for the newly requested report.

Figure 15:
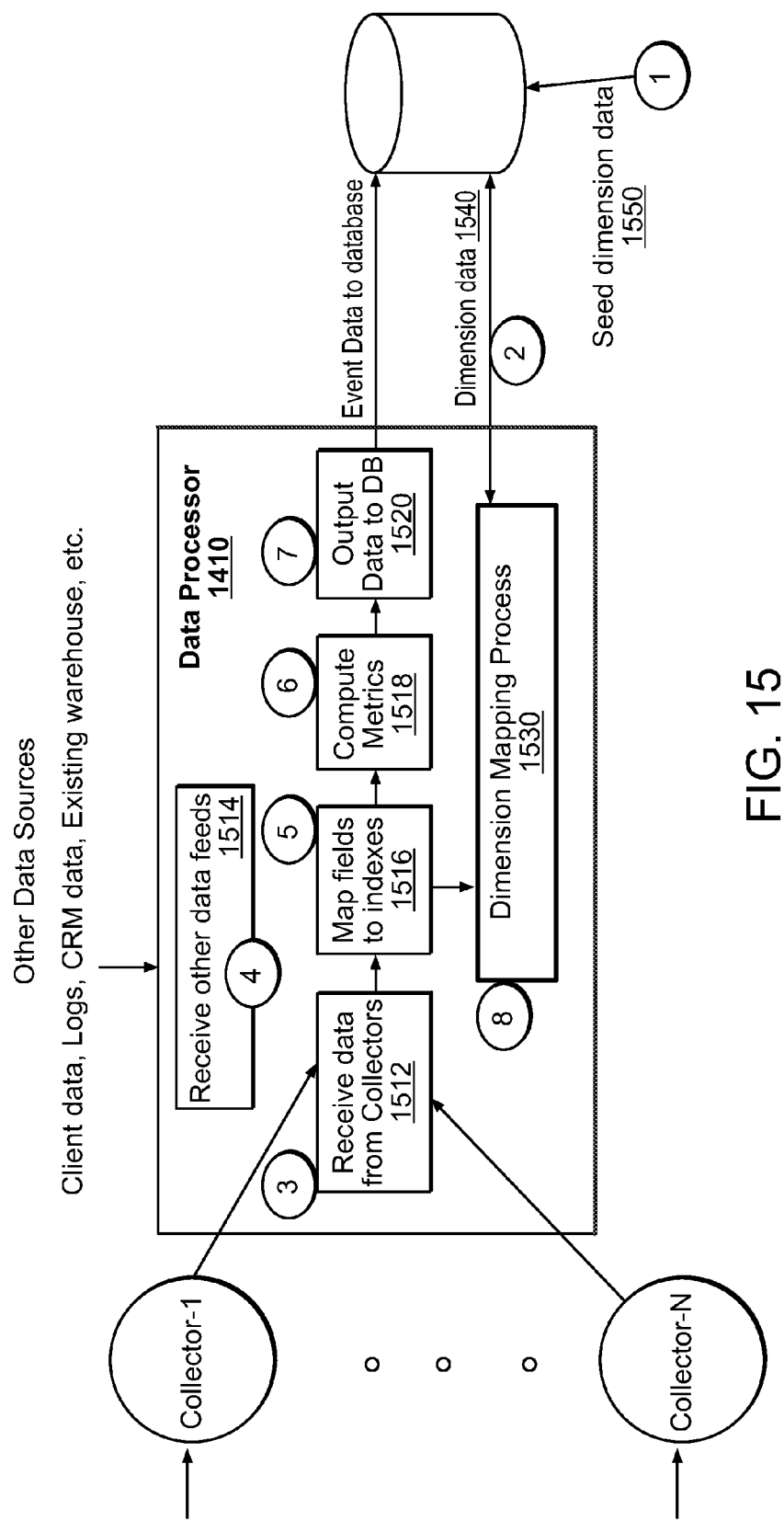
FIG. 15 shows operational flow of a data processor of certain embodiments.

FIG. 15 shows further details on the Data Processor. The operation of the DP is as follows:

1. The seed data for all the dimensions is provided to the database in step 1550;
2. The dimension mapping process 1530 retrieves the dimensions from the database to get access to the indexes as specified by the database;
3. The step 1512 receives data from multiple collectors;
4. The step 1514 receives data from other sources such as server logs, client feeds, location platforms, demographics databases, etc.;
5. The step 1516 correlates the information collected in 1512 and 1514 and maps it to the indexes obtained through step 1530;
6. The step 1518 computes other metrics on this data, such as time spent, data consumed, visits, etc. This requires managing a state machine to be able to correlate sessions to compute the metrics; and
7. The next step 1520 transfers the processed 'event' data to the database.

Figure 16:
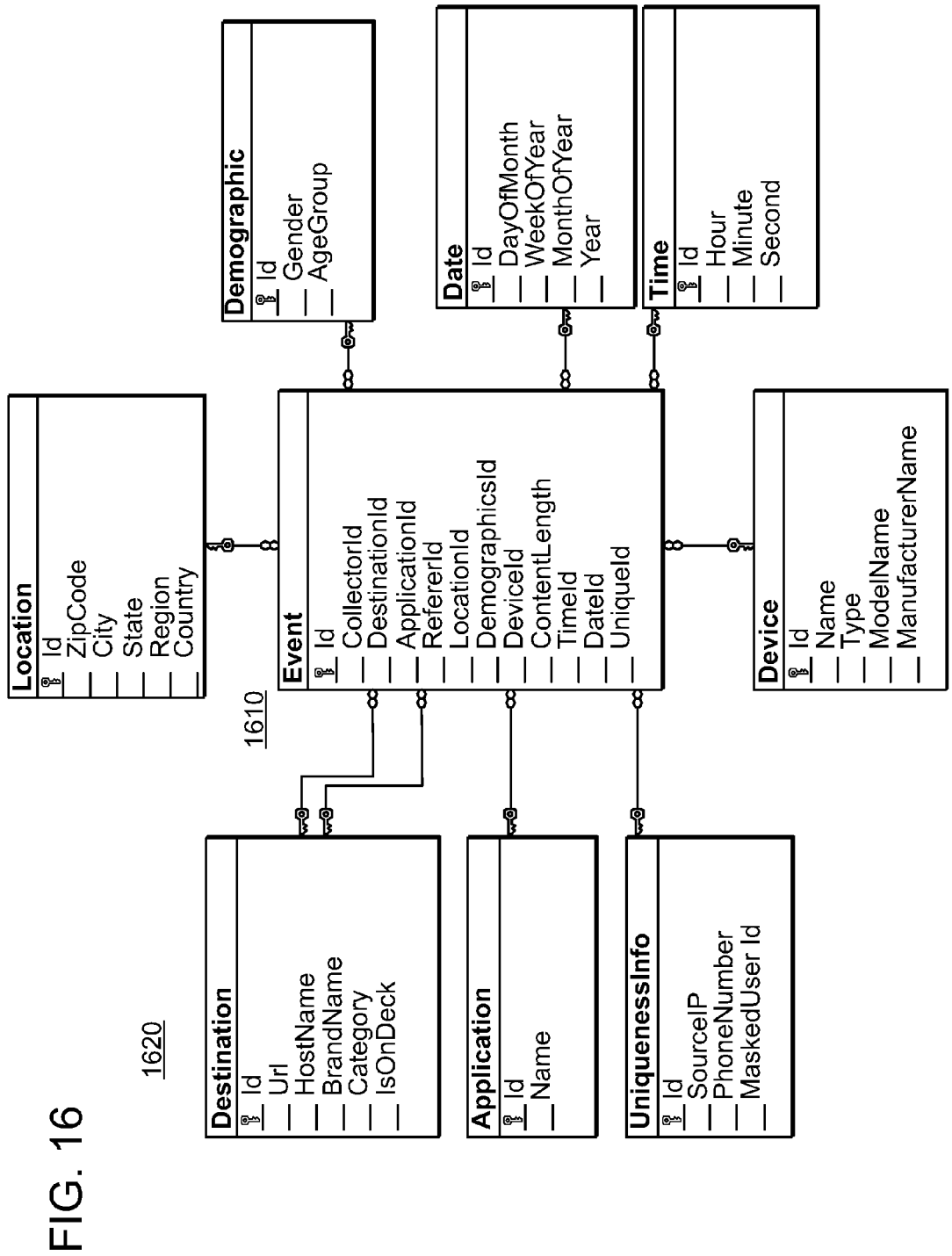
FIG. 16 shows a data schema of certain embodiments.

FIG. 16 shows a typical schema for managing the data within the Database. The data is stored as a star schema, where the events are stored in the fact table 1610 and the dimensions are stored in separate dimension tables such as 1620. This storage optimizes space since each dimension need not be spelled out in each event—only the index of the dimension needs to be used in the event table.

In addition to storing the event data, the Database also stores aggregate data through tables for combinations of dimensions. For example, tables include: [location, device], [location, demographics], [location, application], etc. for each combination, data is stored in different time boundaries. These aggregate tables are updated as new data comes into the system. Based on these aggregate tables, the system also has a set of 'top N' tables that contain data for the pre-defined reports in the system. These tables are constantly updated. As a result, when the user queries the pre-defined report, the data is already available. Depending on the storage available, different levels of combinations of dimensions may be pre-stored in the system. For instance, for 5 dimensions, a total of 10 combinations of 2 dimensions is possible ({destination, device}, {destination, location}, {destination, demographics}, {destination, application}, {device, location}, {device, demographics}, {device, application}, {location, demographics}, {location, application}, {demographics, application}. If 3 dimensions were to be combined, in addition to the above 10, additional combinations include: {destination, device, location}, {destination, device, application}, {destination, device, demographics}, {destination, location, demographics}, {destination, location, application}, {destination, demographics, application}, {device, location, demographics}, {device, location, application}, {location, device, application}, {location, device, demographics}, {location, demographics, application}. Each table is identified with the dimensions. When a query is issued, the list of tables is checked against the dimensions in the query to check whether a pre-defined table (and hence report) exists for that query.

The update of different tables is explained with the help of this example:

To explain the concept further, consider the following example:

Events from the DP would be like:
1. Source IP1, Dest IP2, phone number 1, demographics=18-24 m, location=boston, device=iphone
2. Source IP2, Dest IP2, phone number 3, demographics=18-34, location=Kansas, device=blackberry
. . .

These events are stored in the Event table in the database

At the same time, one of the aggregate tables [location, demographics] lists combinations of demographics and location. Some of the entries in this table include:
Loc=boston, demo=18-24
Loc=boston, demo=25-35
Loc=Kansas, demo=18-24
Loc=kansas, demo=25-35

As part of the table update process, the aggregate loading process will increment the count for Loc=boston, demo=18-24— related to first event and loc=Kansas, demo=18-24 for second event

Then if the Reports manager queries for breakdown of boston by demographics or breakdown of Kansas by demographics, the existing aggregate tables are queried If the Reports Manager queries for breakdown by loc=boston, demo=18-24, and device=iphone, there is no aggregate table. In this case, the event table is queried for that data. If the user selects to add this report to the predefined reports, then a new aggregate table of combination [location, demo, device] is constructed, where some of the entries are:
Loc=boston, demo=18-24, device-iphone
Loc=boston, demo=25-34, device=iphone
Loc=Kansas, demo=18-24, device=iphone
Loc=Kansas, demo=25-34, device=iphone
Loc=boston, demo=18-24, device=blackberry
Loc=boston, demo=25-34, device=blackberry
Loc=Kansas, demo=18-24, device=blackberry
Loc=Kansas, demo=25-34, device=blackberry Note that once this table is created programmatically, it is updated periodically along with other aggregate tables. As a result, this new report is also now a pre-defined report and available whenever the system is queried.

Metrics such as time spent, data consumed are computed in the data processor module. Unique visitor count is a metric that is of interest as well. This metric is computed within the database. Specifically, the mobile number is used to identify unique visitors. This metric is computed from the data in the event table for a specified interval. For example, if the system needs to query the number of unique visitors to a destination such as cnn.com within the last week, a query would be run on the event table data for the last week against cnn.com and the number of unique phone numbers is determined to get a count for unique visitors.

Figure 17:
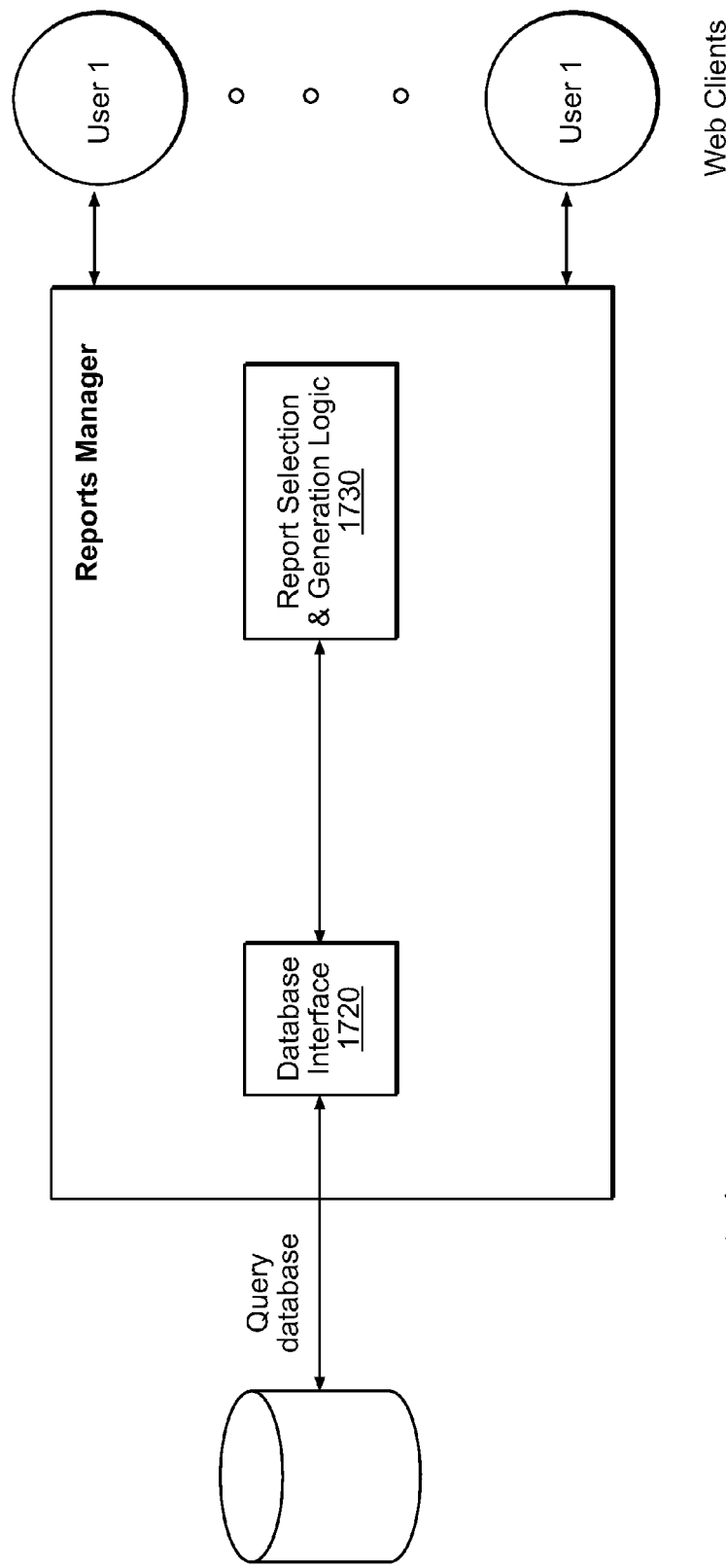
FIG. 17 shows the components of a reports manager of certain embodiments.

FIG. 17 show the details of the Reports Manager. The database interface 1720 interfaces with the database to retrieve results from queries. The 1730 is the main server within the Reports Manager that generates the user interface. Multiple end-users connect to the Reports Manager to view the reports.

Figure 18:
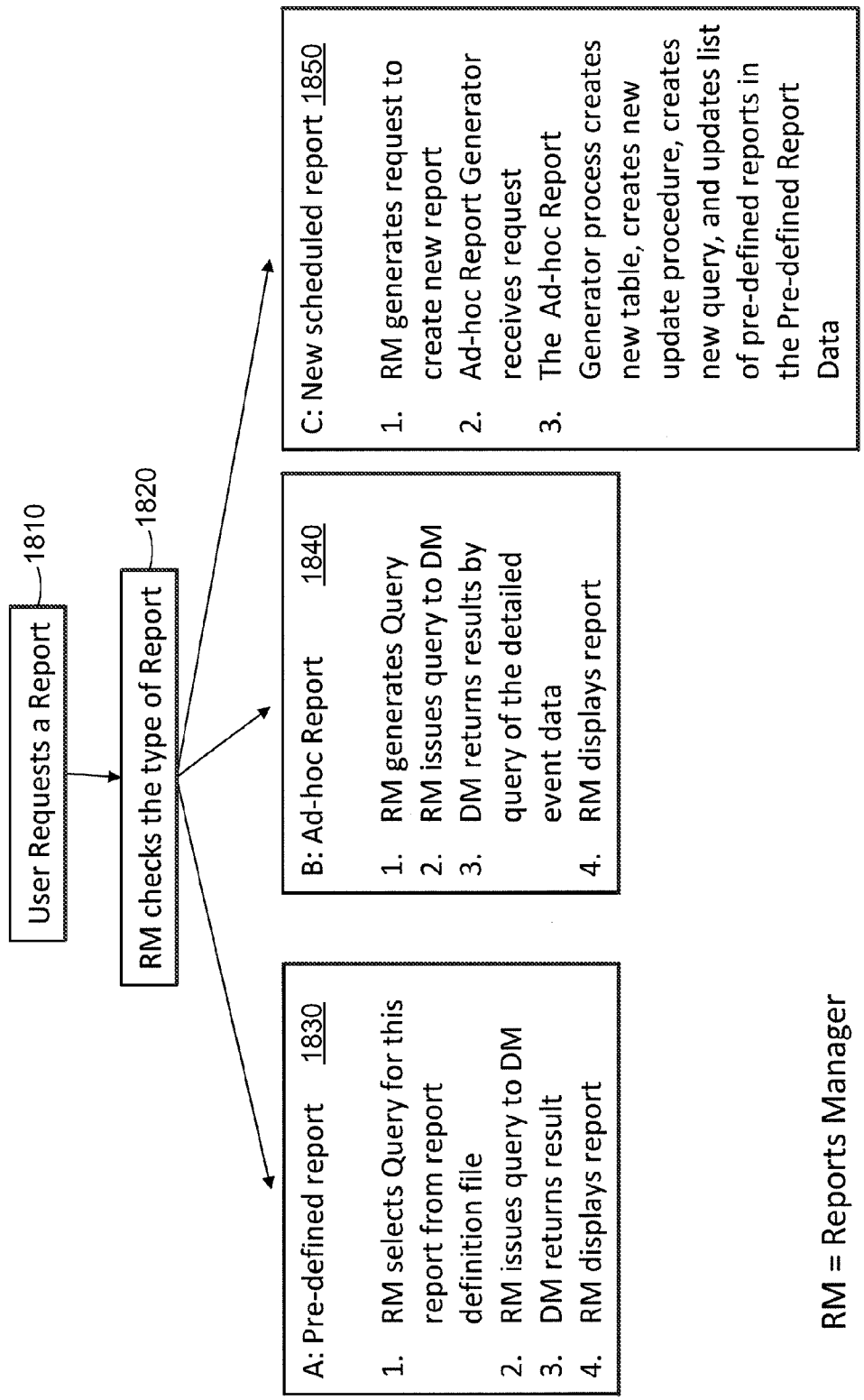
FIG. 18 shows the operational view of the reports manager of certain embodiments.

The operational flow for the system is summarized in the following FIG. 18.

1. In step 1810, the User of the Reports Manager selects a report by navigating through the UI. The user could do one of three things:
   a. Select a pre-defined report
   b. Create an ad-hoc query
   c. Schedule a New Report based on a specific ad-hoc query.
   In all cases, the request is internally mapped by the Reports Manager into a specific query. The query is categorized by dimensions and attributes.

2. In step 1820, the Reports Manager checks whether a pre-defined report for this set of dimensions and attributes already exists by checking the list of pre-defined reports. If the report exists,
   In case the report is a Pre-defined report, as in step 1830, the reports manager does the following functions:
   1. If it is a pre-defined report, the appropriate query is retrieved from the report definition file;
   2. The Reports Manager issues the query to the Data warehouse in the Data Manager;
   3. Data Manager retrieves the data; and
   4. Reports Manager displays the report.
   In case the report is an Ad-hoc report, as in step 1840, the reports manager does the following steps:
   1. If the report is an ad-hoc query, the Reports Manager constructs the query and sends it to the Data warehouse in the Data Manager;
   2. The data warehouse runs the query on the detailed event data;
   3. The Data Manager generates the result, and sends the data to the Reports Manager; and
   4. The Reports Manager selects the right type of report based on the report type and constructs the appropriate report for display.
   In case the report is a new pre-defined report, as in step 1850, the reports manager does the following steps:
   1. If the user requests to schedule a new report based on a past ad-hoc query, the system needs to create a new 'pre-defined' report. In this case, the Reports Manager sends the command to the Ad-hoc Report Generator module in the Data Manager;
   2. The Data Manager receives the request; and
   3. This module parses the request (Commands Processor), creates a new table if required (Schema Manager), creates a new query to generate the report (Query Generator), and creates a new procedure to periodically generate the aggregate data (Update Generator). Based on this, the internal report-query list is updated. From this point on, the new report is available as part of the pre-defined reports in the system. Details of this are described in the next section.

Figure 19:
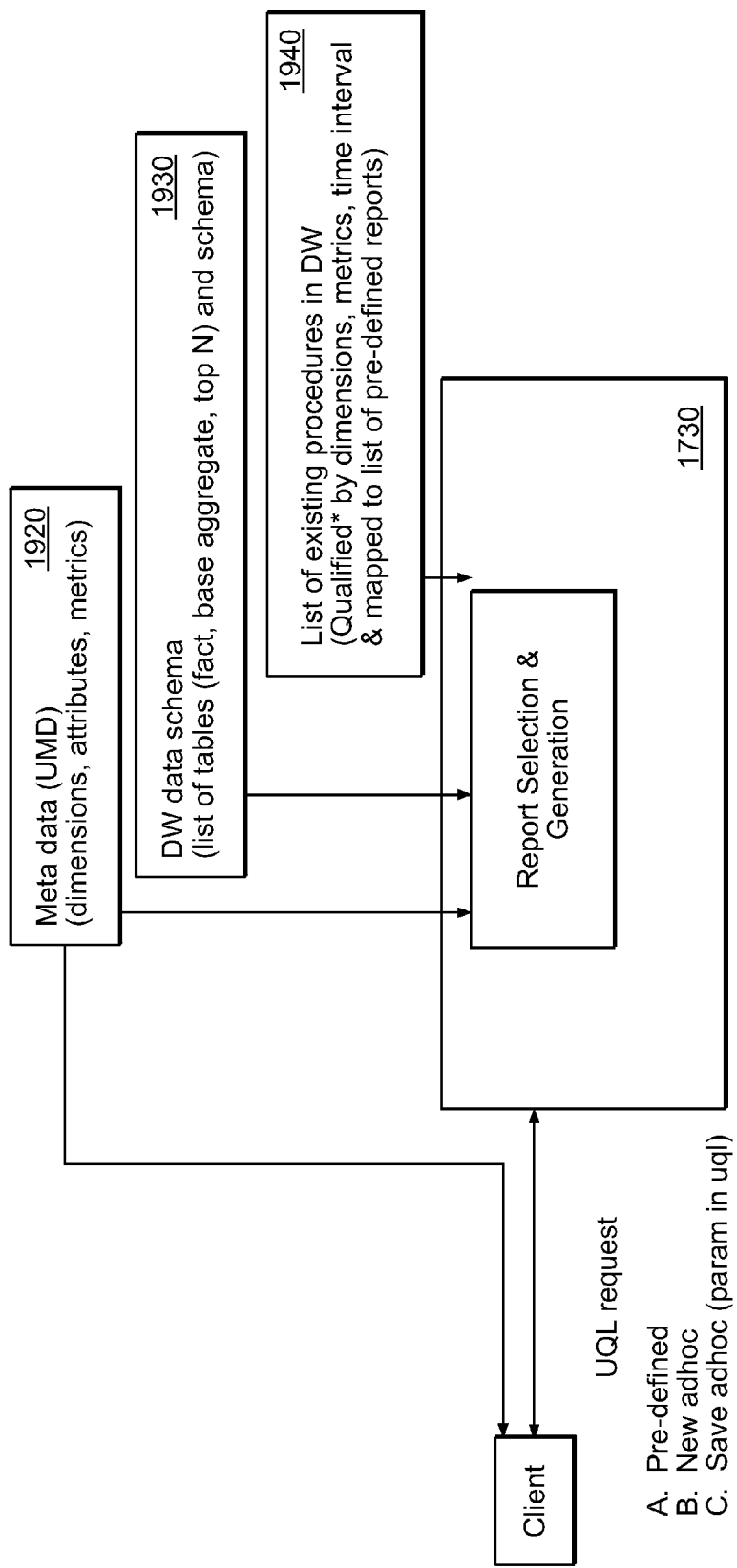
FIG. 19 specifies operational details of the reports manager of certain embodiments.

FIG. 19 shows the details of the 'report selection and generation' module 1730 from FIG. 17. The Reports Manager data includes 1920, which is the list of dimensions and metrics used in the system. Examples of dimensions and metrics were provided in the context of the description of FIG. 2, 1930 which is the list of pre-defined tables. These tables are typically combinations of different dimensions. 1940, is the list of existing procedures in the Data Manager. For each pre-defined report, 1940 lists the procedure to invoke in the database to get the result. For each pre-defined report in the system there is hence a pre-defined procedure.

When the user accesses the system, the user client issues a request to see a report. The request can be one of three types: pre-defined (A), new ad hoc (B) or a save adhoc (C). A request is of type A if the user clicks on a link for a pre-defined report. A request is of type B if the user constructs a new query. A request is of type C if the user constructs a new query and explicitly asks to 'save' this reports. The requests are all passed from the user interface to the report generation logic through a query language. The overall sequence within the module 1730 is as follows:
1. If the request is a pre-defined report of type A, then the reports manager gets the corresponding procedure from the list 1940 and invokes the appropriate procedure. The database runs the procedure and returns the result;
2. If the request is an ad-hoc query of type B, the module 1730 generates a SQL query programmatically from the query language. This query is passed on to the database, which returns the result; and
3. If the request if of type C, where the user requests an ad-hoc query to be saved for future as a pre-defined reports, then module 1730 checks the data definition 1930 to see if a table already exists within the database for the requested dimensions
   1. If a table exists, then 1730 maps the previous query against that table, creates a procedure to reflect this query, and stores the query within the database
   2. If a table does not exist, then a new table with the required dimensions, then 1730 creates a new table, instantiates it against the database, creates procedures to load and update that table, creates procedures to query that table. Tables 1930 and 1940 are the updated appropriately. As a result, the new ad-hoc report now becomes part of the pre-defined reports in the system.

Figure 20:
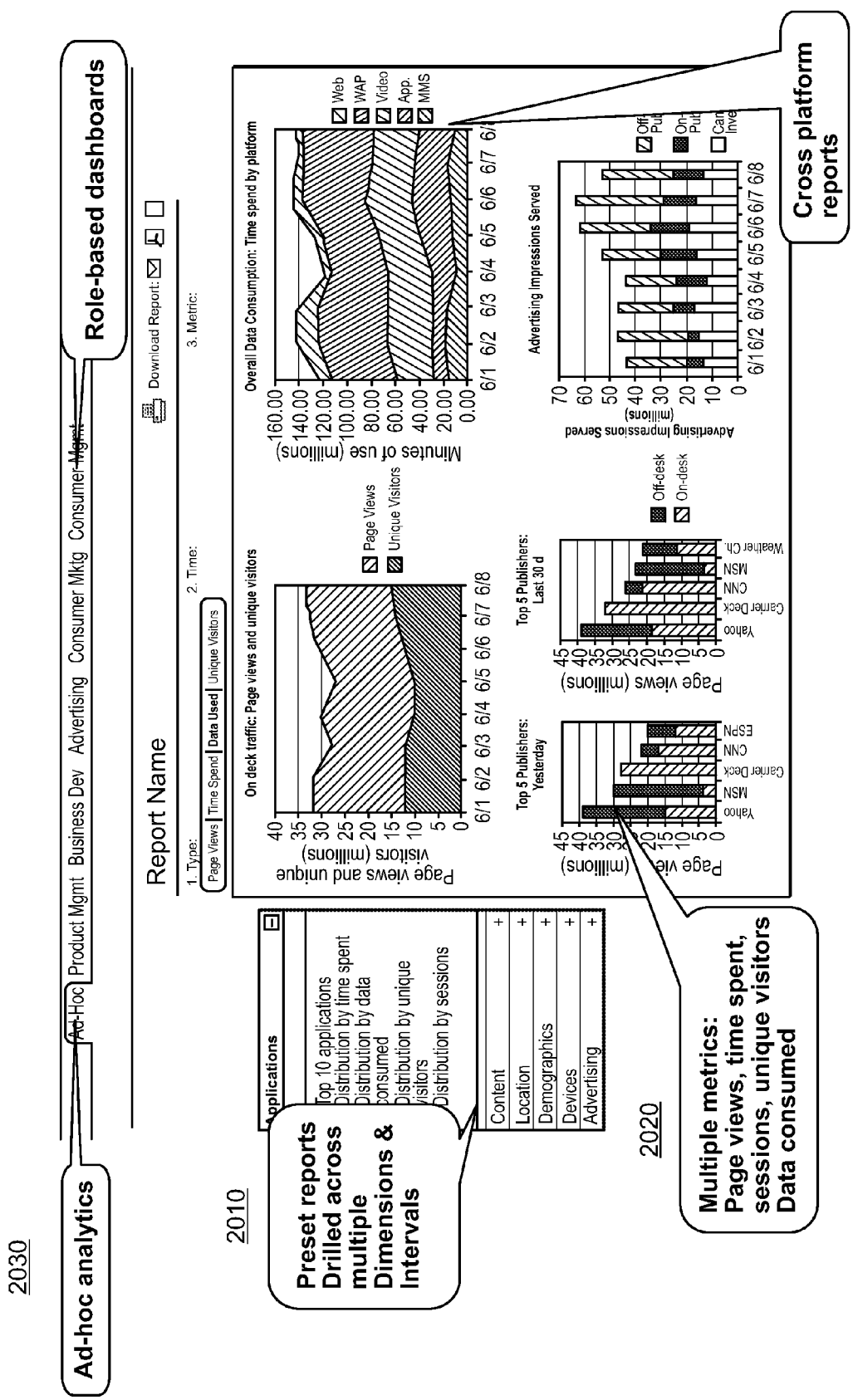
FIG. 20 shows the user interface components of the reports manager of certain embodiments.

FIG. 20 shows the overall structure of the user interface. 2010 shows the pre-defined reports that are defined in the system. 2020 shows the ability to look at different metrics within a report. 2030 shows the ability to perform an ad-hoc query.

Figure 21:
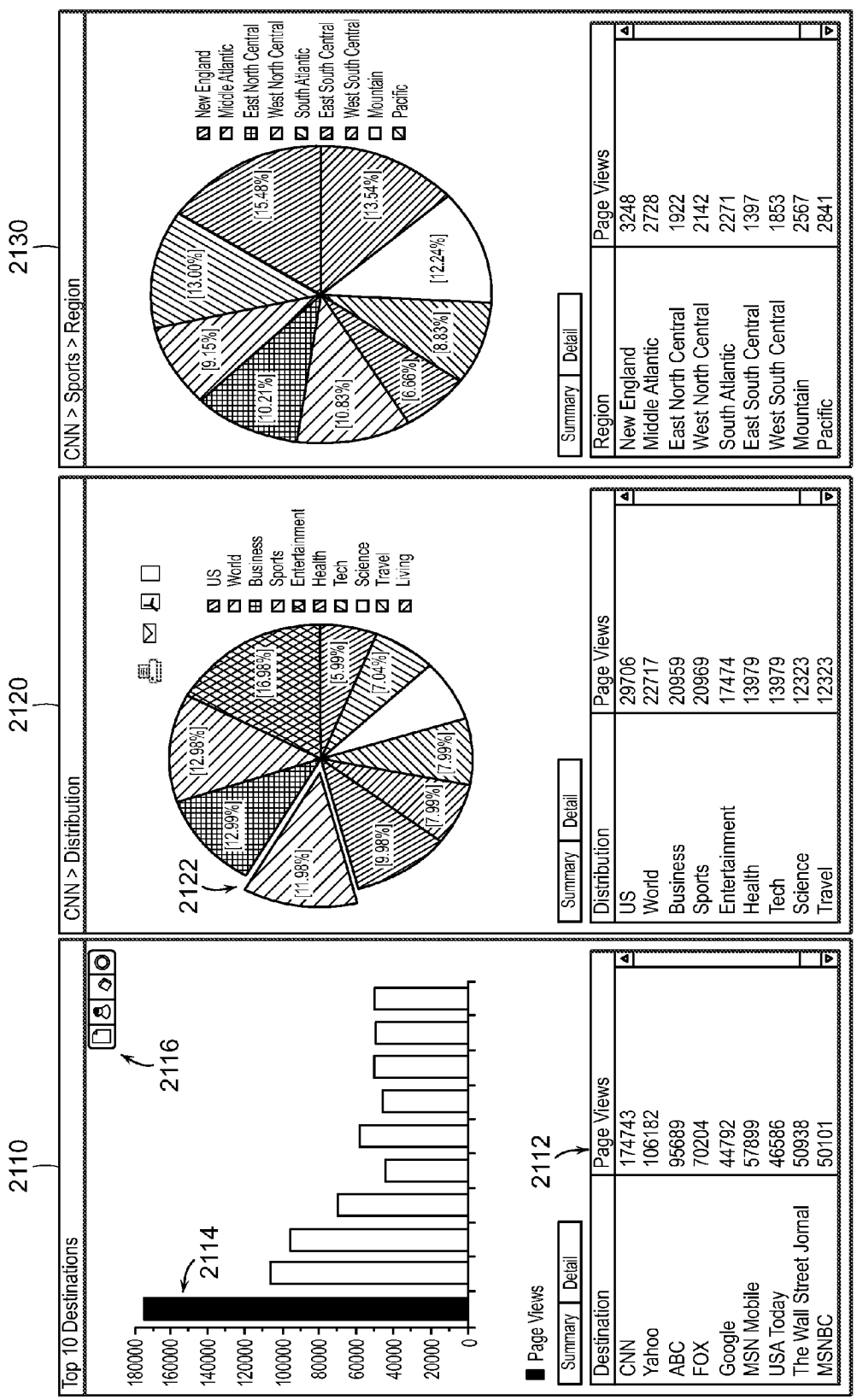
FIG. 21 shows the drill down functionality of the reports manager of certain embodiments.

FIG. 21 shows how an individual report can be drilled down to multiple levels. 2110 shows an example of a top-level query. The report could for instance show the top ten destination URLs along with a tabular description 2112. The Reports Manager looks at the dimension the user is already looking and appropriately presents other dimensions for drill-down. For instance, if the user is viewing the destination dimension, the available drilldowns could be at different attributes within the destination dimension (e.g. on-deck vs. off-deck) or by location, demographics, etc. The user can select a specific URL 2114 and click on it to get more details. The detail allows the user to select which dimension to drill down on—e.g. device type, content category, location, etc. This shows a drill down report 2120. The user may further select an entity on this such as 2122 to see the next level of drill down 2130. For any report, the user can also perform actions 2116 such as printing, emailing, etc.

Figure 22:
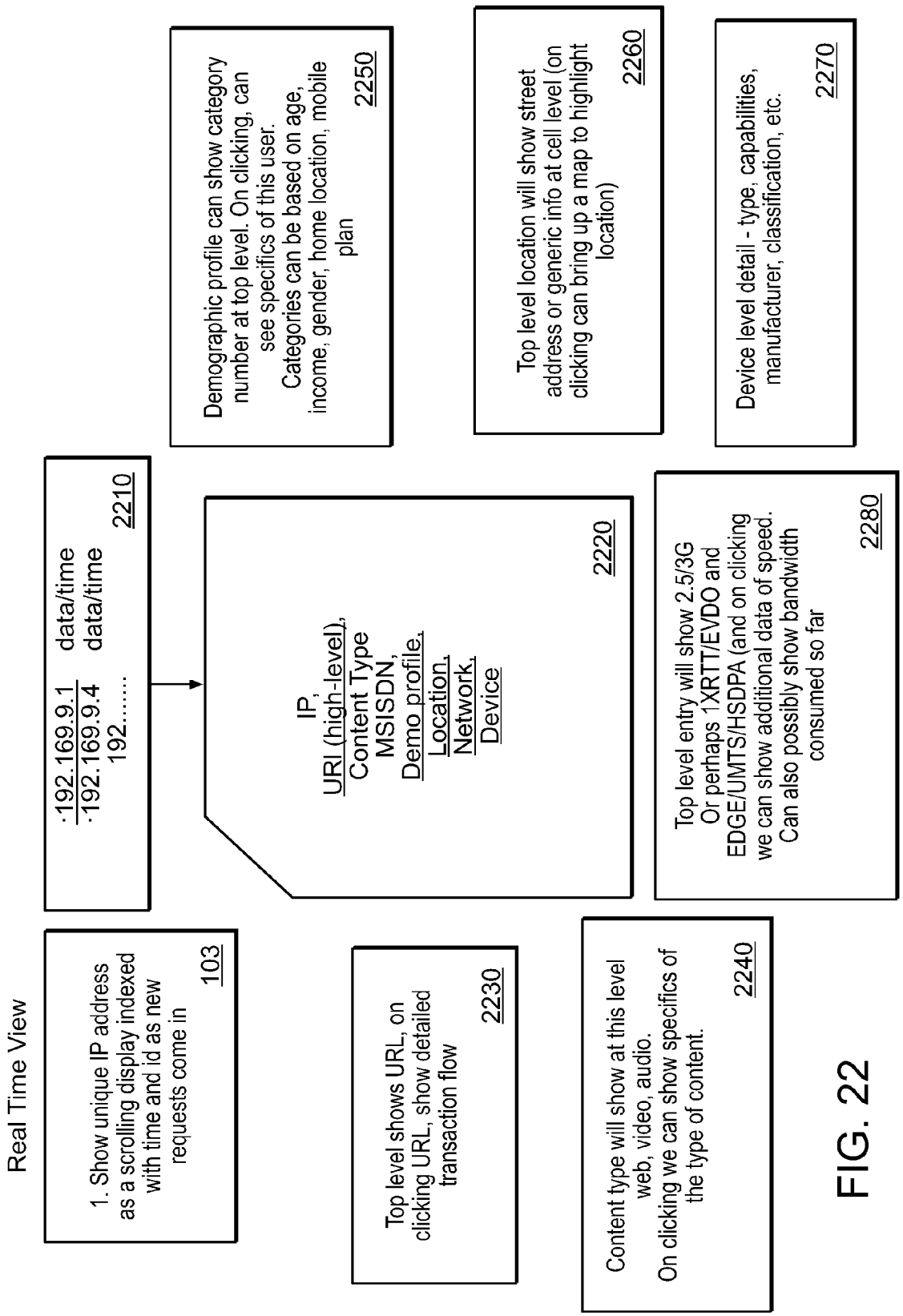
FIG. 22 shows a user-level drill down.

FIG. 22 shows how the invention can also be used to capture user-level information in a representative form. To support user level information, an additional table needs to be created in the Data manager. This table would list the set of users and their current data.

In step 2210, the list of active users in the system can be displayed. A specific user may be selected from this list. The event table would be queried to check for the list of users. For the specific user, the related information is queried from the Event table. In addition, it is also possible to store historic data about a user.

In step 2220, for a selected user, further details related to URL, content type, demographics, location, device, and network can be obtained by clicking the appropriate link.

In Step 2230, by clicking the URL, the history of the URLs accessed by this user for this session may be displayed. Other details as the time spent on each URL and the category can be shown.

In step 2240, by clicking the content type, the type of application can be displayed.

In step 2250, the details of the demographic of this user may be shown, including the segment, rate plan, etc.

In step 2260, the user's current location may be displayed.

In step 2270, the capabilities of the device used in this transaction are shown.

In step 2280, network level information, including data consumed details may be shown.

In general, correlation can be done in several ways. In Option 1, the correlation can be done at reporting time. In Option 2, the correlation can be accomplished by creating new entries or a new database with correlated information as and when data is collected.

Figure 23:
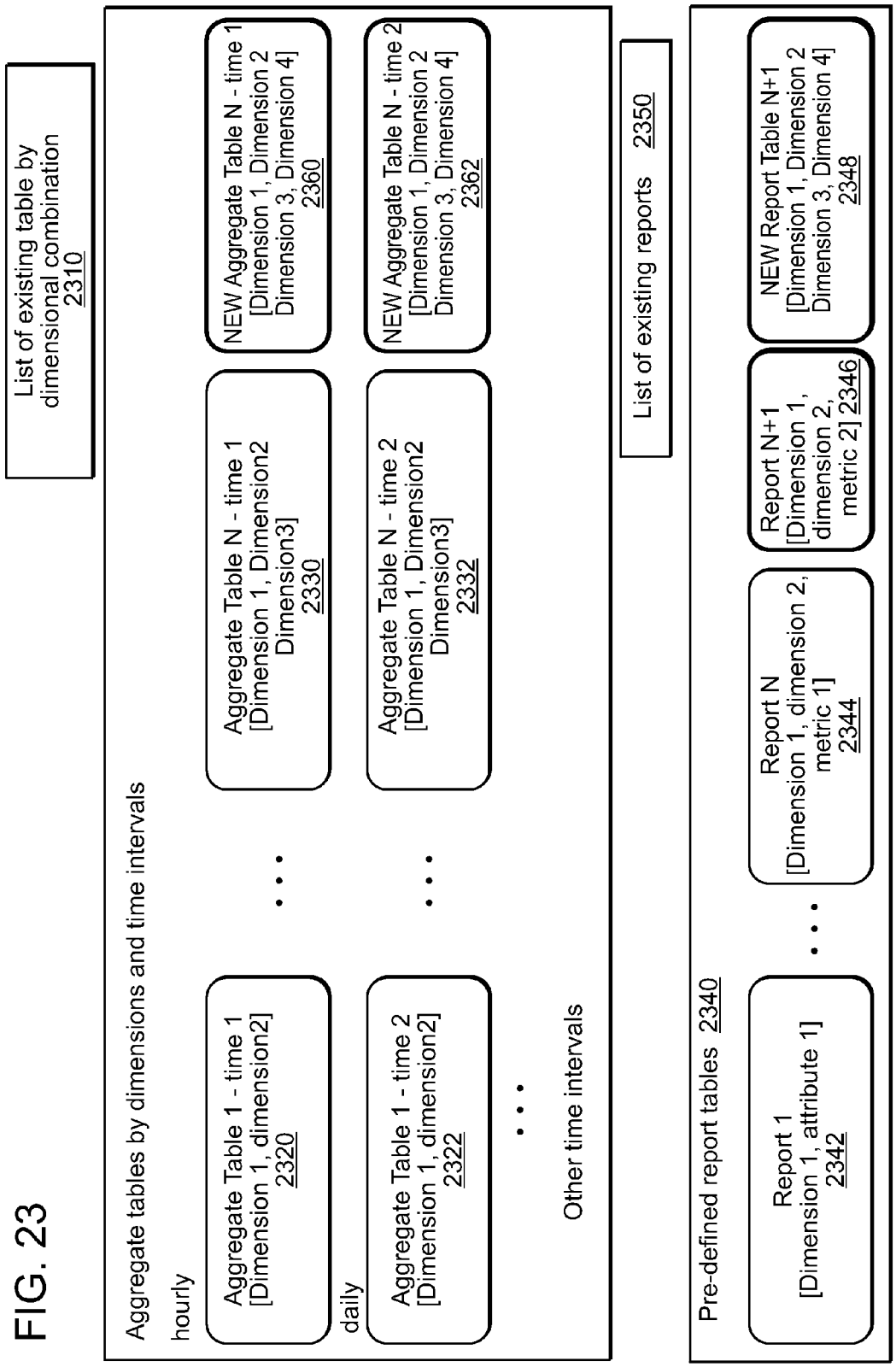
FIG. 23 shows how aggregate tables and defined reports are designed in the data manager.

In addition to storing the event data, the Database also stores aggregate data through tables for combinations of dimensions. FIG. 23 shows the details of how aggregate tables and defined reports are designed into the Data Manager.

The Data Manager consists of aggregate tables for different dimensions and combinations of dimensions. An aggregate table is defined as a table that contains aggregate information, aggregated over users and time intervals. As shown in FIG. 23, 2320 and 2330 represent two tables comprising different dimensional combinations. 2320 could be a combination of destination and device, while 2330 could be a combination of destination, device, and location. Further, each dimensional combination needs to be tracked for different time intervals. As shown in FIG. 23, 2320 tracks table 1 for an hourly time interval, while FIG. 2322 tracks the same table for a daily interval. This means that all events that occur at a time stamp within an hourly interval are aggregated in 2320. 2322 tracks the data over all the hours in the day. As a result, depending on the desired time interval for a report, different tables can be queried.

For example, the event data coming from the collectors comprises user-level data that includes the user's identity and a specific time for the event:

Timestamp1, Source IP1, phone number 2, destination url=cnn, device=blackberry, location=boston, etc.

This information may be populated into an aggregate table for the corresponding dimensions within the time interval. The timestamp and user-level information is removed in this case.

If there are N dimensions, then there are a total of N+NC2+ NC3+ . . . +NC (N−1) such dimensional combinations. Storing data for all such combinations is expensive in terms of storage as well as time to update. The Data Manager is designed to have aggregate tables for a specific set of dimensions, based on the types of pre-defined reports and allowed drill downs. The system maintains a list of existing dimensional combinations available, as shown in 2310.

Reports are designed to report on a specific time interval and across users, e.g. show me number of 18-34 male users coming from boston in the last hour. Keeping this in mind, the system is designed to deliver all reports without having to store every detailed event data. In this case, the aggregate tables need to only store a combination of location and demographics dimension for different time intervals. Further, the aggregate table may have all the possible combinations of demographics and locations. However, pre-defined reports may be interested only in a subset of locations and demographics, in this case it is 18-34 male and Boston. To accommodate this optimization, the data manager also manages pre-defined report tables 2340. The specific pre-defined tables then correspond to the specific report. 2342 for instance, may be a table storing data for users from key locations and corresponding distribution by demographics. 2344 may be a different report, showing distribution of locations by application type.

When the reports manager queries for a specific report, the query is characterized by the dimensions involved. The system first looks at the pre-defined reports to see if a report already exists for that query. If that report doesn't exist, and if the aggregate table exists, then a new report table is created. If the combination of dimensions doesn't exist, then a new aggregate table has to be created and the list of tables 2310 needs to be updated. The list of existing reports 2350 should also be updated to add the new report to this list.

To explain the concept further, consider the following example:

Eevents from the DP would be like:
1. Timestamp1, Source IP1, Dest IP2, phone number 1, demographics=18-24 m, location=boston, device=iphone
2. Timestamp2, Source IP2, Dest IP2, phone number 3, demographics=18-34, location=Kansas, device=blackberry These events are stored in the detailed event data table in the database. At the same time, one of the aggregate tables [location, demographics] lists combinations of demographics and location. The hourly table is updated with these events. Some of the entries in this table include:
Loc=boston, demo=18-24
Loc=boston, demo=25-35
Loc=Kansas, demo=18-24
Loc=kansas, demo=25-35

As part of the table update process, the aggregate loading process will increment the count for Loc=boston, demo=18-24—related to first event and loc=Kansas, demo=18-24 for second event for the appropriate time interval.

A pre-defined report would be 'for specified locations, show a distribution by demographics'. In this case, a pre-defined report table would cover the locations, and for each location, distribution by demographics.

Then if the Reports manager queries for breakdown of Boston users by demographics or breakdown of Kansas users by demographics, the existing pre-defined tables are queried and no new report needs to be created.

Now if the user queries for distribution of users for a location by demographics for a location not in the pre-defined report table, the system would go back to the appropriate aggregate table to get the data for location L. If the user so requires, a new Report table 2346 for such report is instantiated. Note that in this case since the data already existed, a new aggregate table was not required to be created.

Now suppose the user queries for breakdown by loc=boston, demo=18-24, and device=iphone, there is no report table. Further, the system is not collecting data for a combination of location, device, and demographics and so no aggregate table exists. In this case, the detailed event data table is queried for that data. Since the event table has the detailed event data, the results for this data can be presented to the user. If the user selects to add this report to the predefined reports, then a new aggregate table of combination [location, demo, device] is constructed, e.g. 2360, where some of the entries are:
Loc=boston, demo=18-24, device=iphone
Loc=boston, demo=25-34, device=iphone
Loc=Kansas, demo=18-24, device=iphone
Loc=Kansas, demo=25-34, device=iphone
Loc=boston, demo=18-24, device=blackberry
Loc=boston, demo=25-34, device=blackberry
Loc=Kansas, demo=18-24, device=blackberry
Loc=Kansas, demo=25-34, device=blackberry By creating the new aggregate table, the data for the combination of location, demographics, and devices starts getting automatically updated into the system. A corresponding predefined report 2348 is also created into the system This user level information can be stored in an internal database to derive user profiles that can be used for targeting and monitoring.

Preferred embodiments of the invention help service providers answer a number of key questions for mobile operators:

1. Applications: What kind of instantaneous traffic is happening in my network—how many users are doing video, p2p, audio, web, games? How is the traffic distributed across different applications—what fraction of users are using video, what fraction of bandwidth is used by video?

2. Application Details: For a specific application such as video, what prototols are being used—HTTP streaming, RTSP streaming, Flash streaming? For a specific application such as video, what applications are users using to use these applications—Flash, RealPlayer, MediaPlayer, QuickTime, iphone youtube client, custom clients, etc. What are the popular devices and applications on my network?

3. Content Sources: What are the top destinations users are going to in order to get their content? Should I strike special partnerships with these popular content providers?

4. Content Consumption by Location: Where is this content being consumed from? What are the top 20 locations (regions, states, cell sites) that are consuming this content? Are there regions that are accessing more content and hence need to have either more capacity or more optimization in the network?

5. Content Consumption at Content provider level: For a specific content provider, what is the distribution across locations? These high-usage destinations make for good targets for local advertising.

6. Content Distribution and Repeatability: How cacheable is this content—is there a long tail or not? What fraction of this content is repeat content? What is the bandwidth consumed by the repeat content as a fraction of total bandwidth? Can I save on bandwidth by caching or hosting this content locally?

7. Content Rates and Duration: What content rates are people consuming bandwidth at? What is the typical duration of content accessed? How much is there a need for sustained long duration high speed content vs. bursty content? How should I optimize the network to support this content mix?

8. Content Consumption by Demographics: For each demographic group (by age, gender, income, home location), what are the top content destinations? For each demographic group, what are the top locations for high usage? This will help me figure out targeting advertisements.

9. Content Classification: What is the distribution of types of content accessed by users—sports, media, news? What is the split between user generated content vs. traditional studio generated content? For a specific content provider, what is the distribution of types of content?

10. Time of day distribution: Do any of the above patterns change based on time of day?

Preferred embodiments of the invention also help content providers answer a number of key questions:

1. Mobile usage Patterns: How much content consumed by mobile users? How many streams going to mobile? What is the percentage growth? How long are users staying? Information on repeat users?

2. User location: Where is my mobile audience? What are the top 20 geographical locations my users are coming from at any time? What is the distribution?

3. Content classification: Location-level information for each content type?

4. Devices and Network Speeds: What phones are users using? What are the capabilities of devices? What rates are users coming in? How do I need to tailor my content for best viewing?

5. Bandwidth consumption: How much bandwidth is being consumed by mobile users? What percentage of content is repeat content? How will I benefit by caching to reduce my CDN/Hosting bill?

6. Mobility: Is my user base mobile? What percentage of users are consuming content in one location vs. in mobile locations?

7. Demographics: What is the distribution of mobile content usage based on demographics?

8. Competitive: How does consumption for a specific content provider compare with another competitor's consumption?

Under some embodiments, a method, involves a non-inline approach to collect data off the network and from other sources, filter relevant events, for selected events correlate the mobile and IP identities, enrich selected events with other metrics, store data within the database, and compute reports in-line as data is stored.

Under some embodiments, the design allows deploying the solution without requiring changes to the network, applications, or devices.

Under some embodiments, the design allows data to be collected from software clients on end-user devices.

Under some embodiments, the design allows correlating data across multiple dimensions characterizing the user, including application type, content type, demographics, location, device type, network type, etc.

Under some embodiments, the logic allows a user to query the system for real-time reports, where the report data is provided through a data structure that manages multiple aggregates without requiring storage of the entire set of events.

Under some embodiments, user-level information can be obtained from the system.

Under some embodiments, the logic allows drill downs of the reports across different dimensions and via different metrics through the above mentioned data structure.

Under some embodiments, the design allows ad hoc queries to the data using a graphical language, and conversion of selected ad-hoc queries to saved reports for subsequent pre-computation.

Under some embodiments, the design allows the data produced by the invention to be used by service providers.

Under some embodiments, the design allows the data produced by the invention to be used by $3^{rd}$ party content providers and advertisers.

Under some embodiments, the design allows the data produced by the invention to be used by a service provider to optimize the delivery of mobile content within their network through a mobile-aware caching and content delivery system.

Preferred embodiments of the invention provide a monitoring platform that provides non-intrusive, transparent, real-time collection of data application-level activity and other user information on a mobile data network, and subsequent multi-dimensional reporting and analysis of the data. In order to effectively mine a carrier's network to collect mobile data-usage information and provide it to an operator, there are three major steps: data collection, data storage, and operator interface.

In the data collection phase, collection devices are placed in communication with routers in a mobile data network. By collecting the data in this manner, the collectors are able to non-intrusively tap into mobile-data streams and obtain data in real-time.

Once data has been collected from the network, the data collectors filter the collected data so that just application-level data remains. The data collectors also obtain mobile phone numbers from either an AAA database or by tapping into a RADIUS server, and correlate these numbers to their corresponding IP addresses. The collectors then send the filtered data and mobile phone number-IP address pairs to a storage unit.

A data storage unit receives the collected data, and further augments the collected data with supplemental information, such as demographic information, mined from outside sources, such as logs, client-generated data, and SMSC databases. The data is then stored into a database as detailed event data for a predetermined period of time. By storing all of the detailed data, the monitoring platform is able to produce data requested for any ad-hoc query, as long as the data requested was collected within the predetermined period of storage.

The storage unit populates aggregate tables, which have defined dimensions, with newly collected data matching these dimensions. By continuously populating the aggregate tables with collected data, the monitoring platform is able to produce data requested for defined reports in real-time.

An operator also has the option of converting an ad-hoc query into a new, defined report. By transforming the query into a defined report, the operator can ensure that the requested report will reflect all off the relevant data collected from that point forward.

An operator interface acts as the link between the operator and the stored information. The interface determines whether the operator has requested a defined report, ad-hoc report, or new defined report, and retrieves the appropriate data from the data storage in real-time.

After displaying the report, the interface allows the operator to further analyze the report by drilling down into the data by a plurality of different dimensions. The interface reports the dimensional analysis in real-time, and then gives the operator a new batch of dimensions related to the previous drilled dimension with which to conduct further analysis. This approach allows the monitoring platform to give the operator a multi-dimensional analysis of the collected data in real-time.

While the specific details are provided for operating this system in a mobile network, the approach is in no way limited to a mobile network. The same methodology can be applied to other networks, including broadband cable, DSL, WiMAX, and other networks. Equivalent information can be extracted from similar sources of data and similar analytics can be applied to mine the collected data.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

While given components of the system have been described separately, one of ordinary skill also will appreciate that some of the functions may be combined or shared in given instructions, program sequences, code portions, and the like.

What is claimed is:

1. A data manager device for receiving information from multiple collector devices about application-level data activity on a mobile data network so as to provide dynamic real-time reporting about aggregated usage of said mobile data network, said data manager device comprising:

a processor coupled to memory;

a database for storing received application-level data for a predetermined amount of time;

a data processing module for receiving communications and correlated phone numbers associated with user mobile devices from said multiple collector devices, using said phone numbers to query carrier information associated with said phone numbers, and storing said received communications and associated carrier information in said database, said data processing module determining which of said received communications and associated carrier information corresponds to a set of defined real-time reports and storing said corresponding communications and associated carrier information into data structures stored on said data manager, each defined real-time report including a combination of one or more of demographic information about users of said mobile data network, information identifying destinations for user data requests on said mobile data network, and estimated physical location information about users of said mobile data network, wherein received communications and associated carrier information that are determined to correspond to defined real-time reports are used to populate said real-time reports for viewing by an operator; and an analytics module for accessing said database to satisfy operator queries about aggregated usage of said mobile data network, said analytics module being responsive to operator commands to modify said set of defined real-time reports to incorporate an operator query as a newly-generated defined report, said newly-generated defined report including a combination of variables that is different from said set of defined real-time reports, wherein said analytics module satisfies at least a subset of said combination of variables from said set of defined real-time reports and queries said database for data to satisfy remaining variables in said combination of variables that could not be satisfied by said set of defined real-time reports, wherein said data processing module subsequently adds said newly-generated defined report to said set of defined real-time reports.

2. The data manager device of claim 1 wherein each real-time report has a corresponding table which specifies the data to be automatically retained and continuously updated by said data manager to populate the real-time report.

3. The data manager device of claim 2 wherein, in response to said operator command to modify said set of defined real-time reports, said analytics module compares said operator query to said tables to determine whether at least one table satisfies said operator query and if not said analytics module programmatically creates a new table to satisfy said query and modifies the set of defined real-time reports to include a new real-time report corresponding to said new table.

4. The data manager device of claim 1 wherein said real-time reports specify aggregate data about all or a subset of users of said network, said aggregate reports including at least a subset combination of the following set of aggregate date: physical location of users; demographic information about users; content site accessed by users; media type used by users; device type used by users; network type used by users.

5. The data manager device of claim 1 wherein said data manager determines session metrics about said users and at least one real-time report uses said session metrics.

6. The data manager device of claim 5 wherein said session metrics include at least one of page views, number of sessions, number of visits to content, unique visitors to content, time spent during sessions, data consumed by a user during a session.

* * * * *